US012242523B2

(12) United States Patent
Gadd et al.

(10) Patent No.: US 12,242,523 B2
(45) Date of Patent: *Mar. 4, 2025

(54) METHOD AND SYSTEM FOR INTERCEPTING USER INPUTS ON A MOBILE DEVICE

(71) Applicant: Kindred Soul Ltd., London (GB)

(72) Inventors: Michael Gadd, London (GB); Aaron Simpson, London (GB); Matthew Larter, London (GB); Shems Eddine Boukhatem, London (GB); Robyn Chin, London (GB)

(73) Assignee: Kindred Soul Ltd., Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,174

(22) Filed: Aug. 21, 2023

(65) Prior Publication Data

US 2023/0393733 A1 Dec. 7, 2023

Related U.S. Application Data

(63) Continuation of application No. PCT/GB2022/050570, filed on Mar. 3, 2022, which is
(Continued)

(51) Int. Cl.
*G06F 3/04886* (2022.01)
*G06F 3/0481* (2022.01)
(Continued)

(52) U.S. Cl.
CPC ........ *G06F 16/3329* (2019.01); *G06F 3/0481* (2013.01); *G06F 3/04886* (2013.01);
(Continued)

(58) Field of Classification Search
None
See application file for complete search history.

(56) References Cited

U.S. PATENT DOCUMENTS 8,347,398 B1 1/2013 Weber
8,868,451 B2 10/2014 Greaves et al.
(Continued)

FOREIGN PATENT DOCUMENTS

KR 20060116042 A 11/2006
WO 2014117244 A1 8/2014
(Continued)

OTHER PUBLICATIONS

Robert Heaton; "How does online tracking actually work?"; Nov. 20, 2017; robertheaton.com; pp. 1-15.
(Continued)

*Primary Examiner* — Krishna P Neupane
(74) *Attorney, Agent, or Firm* — EIP US LLP

(57) ABSTRACT

Systems and methods relating to a keyboard interceptor are disclosed. The keyboard interceptor receives a first input by a user into a keyboard application on a mobile device. A search query is generated based on the first input and data is located based on the search query. The data is associated with a record comprising a record identifier. The keyboard interceptor associates a GUI element of the keyboard application with the record identifier. A second input is received corresponding to selection of the GUI element. A unique tracking link is generated comprising a URL associated with the locate data and an identifier associated with the selection of the GUI element. The unique tracking link is passed to a web browser application executing on the mobile device to access the website. The web browser application stores a cookie comprising the identifier associated with the selection of the GUI element.

18 Claims, 15 Drawing Sheets

Related U.S. Application Data a continuation of application No. 17/236,646, filed on Apr. 21, 2021, now Pat. No. 11,237,725.

(60) Provisional application No. 63/239,227, filed on Aug. 31, 2021, provisional application No. 63/156,153, filed on Mar. 3, 2021.

(51) Int. Cl.
| | |
|---|---|
| *G06F 3/04895* | (2022.01) |
| *G06F 16/242* | (2019.01) |
| *G06F 16/332* | (2019.01) |
| *G06F 16/3329* | (2025.01) |
| *G06F 16/9532* | (2019.01) |
| *G06F 16/955* | (2019.01) |
| *G06Q 30/0207* | (2023.01) |

(52) U.S. Cl.
CPC ...... *G06F 3/04895* (2013.01); *G06F 16/2423* (2019.01); *G06F 16/3322* (2019.01); *G06F 16/9532* (2019.01); *G06F 16/955* (2019.01); *G06Q 30/0207* (2013.01)

(56) References Cited

U.S. PATENT DOCUMENTS

| | | | |
|---|---|---|---|
| 9,806,942 B2 | 10/2017 | Saxena et al. | |
| 10,055,103 B1* | 8/2018 | Ozuysal | G06F 3/0236 |
| 10,228,819 B2 | 3/2019 | Dostie et al. | |
| 10,423,303 B1 | 9/2019 | Roach et al. | |
| 10,606,477 B1* | 3/2020 | Donnici | G06F 40/274 |
| 10,824,656 B2 | 11/2020 | Hwang | |
| 10,887,201 B2 | 1/2021 | Park | |
| 11,068,940 B2 | 7/2021 | Kim et al. | |
| 11,430,000 B1 | 8/2022 | Depaolo et al. | |
| 2001/0047347 A1 | 11/2001 | Perell et al. | |
| 2005/0027670 A1 | 2/2005 | Petropoulos | |
| 2005/0043939 A1 | 2/2005 | Trower et al. | |
| 2006/0055780 A1 | 3/2006 | Zemer et al. | |
| 2007/0011340 A1 | 1/2007 | Seidl et al. | |
| 2008/0082905 A1 | 4/2008 | Martinez et al. | |
| 2011/0099251 A1 | 4/2011 | Tsukada et al. | |
| 2012/0197981 A1 | 8/2012 | Chan | |
| 2013/0073388 A1 | 3/2013 | Heath | |
| 2013/0205198 A1 | 8/2013 | Cohen | |
| 2013/0227057 A1* | 8/2013 | Goldstein | H04L 43/08 709/217 |
| 2015/0073892 A1 | 3/2015 | Brown et al. | |
| 2015/0106181 A1 | 4/2015 | Kluth | |
| 2015/0143269 A1 | 5/2015 | Liu et al. | |
| 2015/0154660 A1 | 6/2015 | Weald et al. | |
| 2016/0103876 A1 | 4/2016 | Bakir et al. | |
| 2017/0032147 A1 | 2/2017 | Denner et al. | |
| 2017/0054820 A1 | 2/2017 | Webber et al. | |
| 2017/0193481 A1 | 7/2017 | Szeto et al. | |
| 2018/0046637 A1 | 2/2018 | Koopman et al. | |
| 2018/0293601 A1 | 10/2018 | Glazier | |
| 2018/0293602 A1 | 10/2018 | Glazier et al. | |
| 2018/0293603 A1 | 10/2018 | Glazier et al. | |
| 2018/0315041 A1 | 11/2018 | Wynn | |
| 2018/0322519 A1 | 11/2018 | Goecke et al. | |
| 2019/0066156 A1 | 2/2019 | McMichael et al. | |
| 2019/0347685 A1 | 11/2019 | Glazier et al. | |
| 2020/0082423 A1 | 3/2020 | Glazier et al. | |
| 2020/0242648 A1* | 7/2020 | Glazier | H04L 67/535 |
| 2020/0364734 A1 | 11/2020 | Glazier et al. | |
| 2021/0124630 A1* | 4/2021 | Chew | G06F 9/547 |
| 2021/0168140 A1 | 6/2021 | Canfield et al. | |
| 2021/0192003 A1 | 6/2021 | Kargaran | |
| 2022/0284050 A1 | 9/2022 | Gadd et al. | |
| 2022/0284063 A1 | 9/2022 | Gadd et al. | |
| 2023/0052456 A1 | 2/2023 | Gadd et al. | |
| 2023/0300183 A1 | 9/2023 | Craparo et al. | |

FOREIGN PATENT DOCUMENTS

| | | |
|---|---|---|
| WO | 2017072589 A2 | 5/2017 |
| WO | 2017184212 A1 | 10/2017 |
| WO | 2018191030 A1 | 10/2018 |

OTHER PUBLICATIONS

International Search report and Written Opinion dated Aug. 12, 2022 for PCT International Application No. PCT/GB2022/050570.
Anonymous, "Sharing Content with Intents" CodePath Android Cliffnotes, Aug. 25, 2014 (Aug. 25, 2014), pp. 1-3, XP055947268.
Anonymous: "javascript—chrome extension code to get current active tab url and detect any url update in it as well"—Stack Overflow, Feb. 28, 2019 (Feb. 28, 2019), pp. 1-2, XP055947269.
Notice of Allowance dated Nov. 26, 2021 for U.S. Appl. No. 17/236,646.
Non-Final Office Action dated Jun. 21, 2021 for U.S. Appl. No. 17/236,646.
Final Office Action dated Sep. 20, 2021 for U.S. Appl. No. 17/236,646.
Non-Final Office Action dated Aug. 17, 2022 for U.S. Appl. No. 17/560,780.
Non-Final Office Action dated May 22, 2023 for U.S. Appl. No. 17/980,466.

* cited by examiner

METHOD AND SYSTEM FOR INTERCEPTING USER INPUTS ON A MOBILE DEVICE

CROSS-REFERENCE TO RELATED APPLICATIONS

This application is a continuation under 35 U.S.C. § 120 of International Application No. PCT/GB2022/050570, filed Mar. 3, 2022, which claims the benefit of U.S. Provisional Application No. 63/156,153, filed Mar. 3, 2021, U.S. Non-Provisional application Ser. No. 17/236,646, filed Apr. 21, 2021 and U.S. Provisional Application No. 63/239,227, filed Aug. 31, 2021. The above-referenced patent applications are incorporated by reference in their entirety.

BACKGROUND OF THE INVENTION

Field of the Invention

The present disclosure relates to mobile computing devices. In particular, the present disclosure relates to a method and system for intercepting user inputs and more particularly to a keyboard interceptor for mobile computing devices.

Description of Related Art

Web browsers are software applications that provide access to the World Wide Web. On many computing devices, such as desktop computers, web browser extensions are available for web browsers. A web browser extension is a software application that adds a capability, utility, or functionality to a web browser. Mostly, web browser extensions extend or enhance the functionality of the web browser, interact with websites, provide proactive information based on browsing, or provide useful tools to enhance the user experience.

Web browsers are also available for mobile devices and offer similar functionality to their desktop counterparts. On mobile devices, some web browsers, such as Safari® on iOS® (14 and lower) and Chrome™ on Android™, lack web browser extension support. Thus, the enhanced functionality provided by web browser extensions may not be available to mobile device users. There are several reasons why web browser extensions may not be available on some mobile web browsers. For example, extensions present on a laptop or desktop may not be intuitive enough to use on the screen sizes available on mobile devices. There are also security restrictions within mobile operating systems, and limitations with web browser application capacity. Further, mobile operating systems may prioritise stability and therefore have fewer features compared to desktop based operating systems.

On the other hand, some mobile web browsers, such as Safari® on iOS® 15, do support web browser extensions. As noted above, there can be challenges in implementing these in an intuitive and easy to use manner on the often-smaller hardware and software of mobile devices. It is therefore desirable to improve the user experience when both mobile web browser extensions are, and are not, available.

An implementation of a desktop web browser extension may be in displaying content to a user, such as an advertisement, as they are accessing a web browser application. Targeting a user's mobile device is an effective form of advertising given that most users carry their mobile device with them at all times. However, because of the above-mentioned difficulties with web browser extensions on mobile devices, brands are often limited to displaying content to a user via pop up adverts in a website the user is currently browsing via a mobile web browser application. These advertisements can often feel intrusive and their relevance may depend on the user's previous browser history. Furthermore, brands are limited in the content they can include in such advertisements due to screen space and bandwidth constraints. Alternatively, if the user has an app associated with the brand on their mobile device, the app may forward push notifications to the user. The content of push notifications is typically limited to a single line of text, and an inattentive user may simply dismiss the notification without reading it. An improved advertisement targeting method is therefore also desirable.

SUMMARY

According to a first aspect of the present disclosure, there is provided a computer-implemented method comprising:
  receiving a first input by a user into a keyboard application on a mobile device;
  generating a search query based on the first input;
  locating data based on the search query, wherein the data is associated with a record, the record comprising a record identifier;
  associating, within a user interface of the keyboard application, an element of a graphical user interface, GUI, of the mobile device, with the record identifier;
  receiving a second input, by the user, corresponding to selection of the element of the GUI;
  responsive to receiving the second input, generating a unique tracking link comprising a URL and an identifier associated with the selection of the GUI element, the URL being for a website associated with the located data;
  passing the unique tracking link to a web browser application executing on the mobile device, whereby to access the website; and
  storing, by the web browser application while accessing the website, a cookie comprising the identifier associated with the selection of the GUI element.

The computer-implemented method may be at least partially performed by a keyboard interceptor on the mobile device. Therefore, the computer-implemented method provides replicated functionality of desktop web browser extensions for the mobile device by means of a keyboard interceptor.

The computer-implemented method provides a convenient search for the websites based on the first input by the user. Storing a cookie comprising the identifier associated with the selection of the GUI element allows tracking of the user's activity on the website as a result. The tracking may be used to associate a particular activity with the user. Furthermore, the form of the unique tracking link is secure because it does not contain any user information. Therefore, a third party who snoops on the user as they browse the website will not be able to associate the particular activity of the user on the website with any individual.

The identifier associated with the selection of the GUI element may be randomly generated.

The user may be able to provide input via one or more fields within an application executing on the mobile device. The method may further comprise determining that the field into which the first input is provided is a field that is designated for Uniform Resource Locators, text, coupon codes and/or internet searches. Locating the data may include forwarding an application programming interface, API, call to a server. Generating the unique tracking link may then comprise forwarding a further API call to the server requesting the unique tracking link. Locating the data may include performing a search of a local storage of the mobile device. The server may store the generated unique tracking link in the database.

The first input may be text typed by the user. The method may further comprise waiting a predetermined amount of time after the user has finished typing before generating the search query. Waiting a predetermined amount of time increases the efficiency of the method by reducing the number of computations that need to be performed.

The unique tracking link may comprise the URL encoded with the identifier associated with the selection of the GUI element. The data may be merchant data, and the URL may be a redirect URL for a website associated with the merchant. The merchant data may further comprise a logo associated with the merchant, and an active deal associated with the merchant. In this case, associating the element of the GUI with the record identifier may comprise displaying the logo associated with the merchant and text indicating the active deal. The cookie may allow the merchant to determine that a purchase has been made by the user. The method may further comprise receiving a reward issued by the merchant in response to the purchase made by the user.

In the case that the server generates the unique tracking link, the server may further store the unique tracking link in the database and associate it with a user identity. Therefore, because the cookie comprises the identifier associated with the selection of the GUI element that is assigned when the unique tracking link was generated, and because the unique tracking link may be stored in association with the user identity when the unique tracking link is generated, the merchant can identify the user as being sent to their website via an action of the server. The merchant may therefore provide an entity associated with the server a commission based on the purchase.

The method may further comprise displaying an icon within a user interface of the keyboard application indicating that the data has been located. A further input, by the user, may be received corresponding to selection of the icon. In this case, displaying the element of the GUI is responsive to receiving the further input.

According to a second aspect of the present disclosure there is provided a mobile device configured with a set of instructions which when executed by the mobile device cause the mobile device to perform the above-described method.

According to a third aspect of the present disclosure there is provided a system. The system comprises a keyboard application with a keyboard interceptor, a database and a server communicatively coupled to the database. The database comprises a plurality of records, each of the records comprising: a record identifier; data; and a URL for a website associated with the data. The server is configured to locate data in the database in response to receiving an API call. The system is configured to perform the method according to the first aspect of the present disclosure.

According to a fourth aspect of the present disclosure, there is provided a computer-implemented method to be performed by a mobile device of a user comprising:
  receiving, by a keyboard application executing on a mobile device, a first input;
  generating, by the keyboard application, a search query based on the first input;
  locating data based on the search query, wherein the located data is associated with a record, the record comprises a record identifier, and the located data comprises at least one of:
    a coupon code; and
    one or more survey questions;
  associating, by the keyboard application, a graphical user interface, GUI, element of the mobile device, with the record identifier of the located data;
  receiving, by the keyboard application, a second input, by a user, corresponding to selection of the GUI element;
  responsive to receiving the second input, performing, by the keyboard application, an action associated with the located data, wherein the action comprises one of:
    causing the coupon code associated with the located data to be passed into a text field within an application executing on the mobile device; and
    displaying the one or more survey questions associated with the located data in the GUI of the mobile device.

The computer-implemented method may be at least partially performed by a keyboard application on the mobile device. Therefore, the computer-implemented methods provide replicated functionality of desktop web browser extensions for the mobile device by means of a keyboard application.

The computer-implemented method provides a convenient search for data such as coupon codes and surveys and has advantages over known methods executing on mobile devices. One such advantage is that the first input need not be provided by a user. For example, the keyboard application may receive data indicative of current content displayed in the GUI of the mobile device, and determine a domain name associated with a website currently being viewed by the user by analyzing the data indicative of the current content displayed in the GUI of the mobile device. In this case, the first input may comprise the determined domain name. The current content displayed in the GUI of the mobile device may comprise a screenshot of the GUI of the mobile device. In another example, the current content displayed in the GUI is received from an accessibility service operating on the mobile device.

In some cases, a mobile web browser application may support mobile web browser extension capability. In such cases, the keyboard application may receive, from a web browser extension associated with the web browser application, a domain name associated with a website currently being accessed by the web browser application. The first input may then comprise the domain name.

In some examples, the keyboard application may receive, from an application executing on the mobile device and currently being accessed, an identifier associated with the application that uniquely identifies the application. In this case, the first input may comprise the identifier associated with the application.

In further examples, responsive to receiving the second input, the keyboard application may, without user input, generate a unique tracking link comprising a URL and a randomly generated identifier, the URL being for a website associated with the located data. The keyboard application may pass the unique tracking link to an address bar of a web browser application executing on the mobile device.

When the located data comprises a coupon code, the keyboard application may store the coupon code in memory. Prior to passing the coupon code into the text field, the keyboard application may determine that that text field is a text field designated for coupon codes. Determining that the text field is a text field designated for coupon codes may comprise analyzing, by the keyboard application, a screenshot of the GUI of the mobile device. In another example, determining that the text field is a text field designated for coupon codes may comprise receiving, by the keyboard application, a field designation type from an autofill service operating on the mobile device. In yet another example, determining that the text field is a text field designated for coupon codes may comprise receiving, by the keyboard application, a field designation type from a web browser extension associated with a web browser application executing on the mobile device.

The coupon code and/or one or more survey questions may be associated with a merchant. The merchant may determine that the user has used a coupon code or completed a survey. An example of how this can be achieved is as follows. Responsive to receiving the second input, the keyboard application may generate, without user input, a randomly generated identifier associated with the selection of the GUI element. The randomly generated identifier may be stored in a database in association with the record identifier and a user identifier. Further, the web browser application may store a cookie comprising the randomly generated identifier associated with the selection of the GUI element. In this case, a new tab may be opened within the web browser application, so that the cookie is stored when the new tab is opened. The new tab may be closed when the cookie has been stored. The new tab may be opened and closed by the keyboard application or a web browser extension.

The randomly generated identifier, stored both in the database and as part of the cookie, allows the merchant to track the action(s) performed by the user. An indication of the action(s) performed, as well as the randomly generated identifier associated with the action(s), may be transmitted to an entity associated with the database. The transmission may further comprise a commission associated with the performed action(s). The entity may provide a portion of this commission to the user as a reward for performing the action(s). The entity may identify the user by matching the randomly generated identifier in the transmission with the randomly generated identifier stored in the database in association with the user identifier.

When the located data comprises one or more survey questions, the computer-implemented method may further comprise receiving one or more further inputs by the user, said further inputs corresponding to completion of the one or more survey questions, and storing, in a database, data indicative of the one or more further inputs in association with a randomly generated identifier and a user identifier.

Locating the data may include forwarding an application programming interface, API, call to a server. Alternatively, locating the data may include performing a search of a local storage of the mobile device.

As discussed, the data may be merchant data, and include one or more of a coupon code, one or more survey questions, and media associated with the merchant. The merchant data may further comprise a logo associated with the merchant, and an active deal associated with the merchant. In this case, associating the element of the GUI with the record identifier may comprise displaying the logo associated with the merchant and text indicating the active deal.

The method may further comprise displaying an icon within a user interface of the keyboard application indicating that the data has been located. A further input, by the user, may be received corresponding to selection of the icon. In this case, displaying the element of the GUI is responsive to receiving the further input.

According to a fifth aspect of the present disclosure there is provided a tangible, non-transitory computer-readable memory comprising instructions, that when performed by a processor of a mobile device, cause a keyboard application executing on the mobile device to perform the methods according to the fourth aspect.

According to a sixth aspect of the present disclosure there is provided a system. The system comprises a keyboard application, a database and a server communicatively coupled to the database. The database comprises a plurality of records, each of the records comprising: a record identifier and data, the data comprising one or more coupon codes and one or more survey questions. The server is configured to locate data in the database in response to receiving an API call. The system is configured to perform the methods according to the fourth aspect of the present disclosure.

Further features and advantages of the invention will become apparent from the following description of preferred embodiments of the invention, given by way of example only, which is made with reference to the accompanying drawings.

DETAILED DESCRIPTION

Web browsers running on certain computing devices, such as desktop computing devices, may interface with one or more web browser extensions. A web browser extension may enhance a certain functionality of the web browser. In one example, a web browser extension monitors a purchase made by a user on a website. The web browser extension may, either before or after the purchase, analyse the URL of the website and determine whether a merchant associated with the URL has an agreement with the web browser extension developer. The agreement may involve the merchant providing the developer a commission for sending the user to the website in order to make the purchase. In return, a portion of the commission may be awarded to the user. The portion of the commission awarded to the user may be in the form of cash back, discount codes, donations for charity, or another financial incentive.

In other examples, a web browser extension searches for, and inserts, one or more coupon codes into a webpage currently being accessed by a user. In another example, a web browser extension may search for, and allow a user to complete, one or more surveys as they are browsing an arbitrary website. An entity associated with the web browser extension may receive a commission for providing the coupon code or survey. For completion of a survey, the user may receive a portion of this commission from the entity associated with the web browser extension, which may be in the form of a coupon code, donation to charity, or other financial incentive.

Embodiments described herein relate to a keyboard interceptor for mobile devices. In some embodiments a keyboard interceptor may be software that replicates the same level of interactivity, information and utility found in a desktop or laptop web browser extension but is separate from a mobile web browser. These embodiments are particularly well suited for mobile devices configured with web browsers such as Safari® on iOS® 14 or lower, and Chrome™ on Android™, where web browser extensions are not available. In other embodiments a keyboard interceptor may be software embodied as a browser extension. These embodiments are particularly well suited for mobile devices mobile devices configured with web browsers such as Safari® on iOS® 15 or higher. Various implementations of such a keyboard interceptor will now be described.

Single User Implementation

Figure 1:
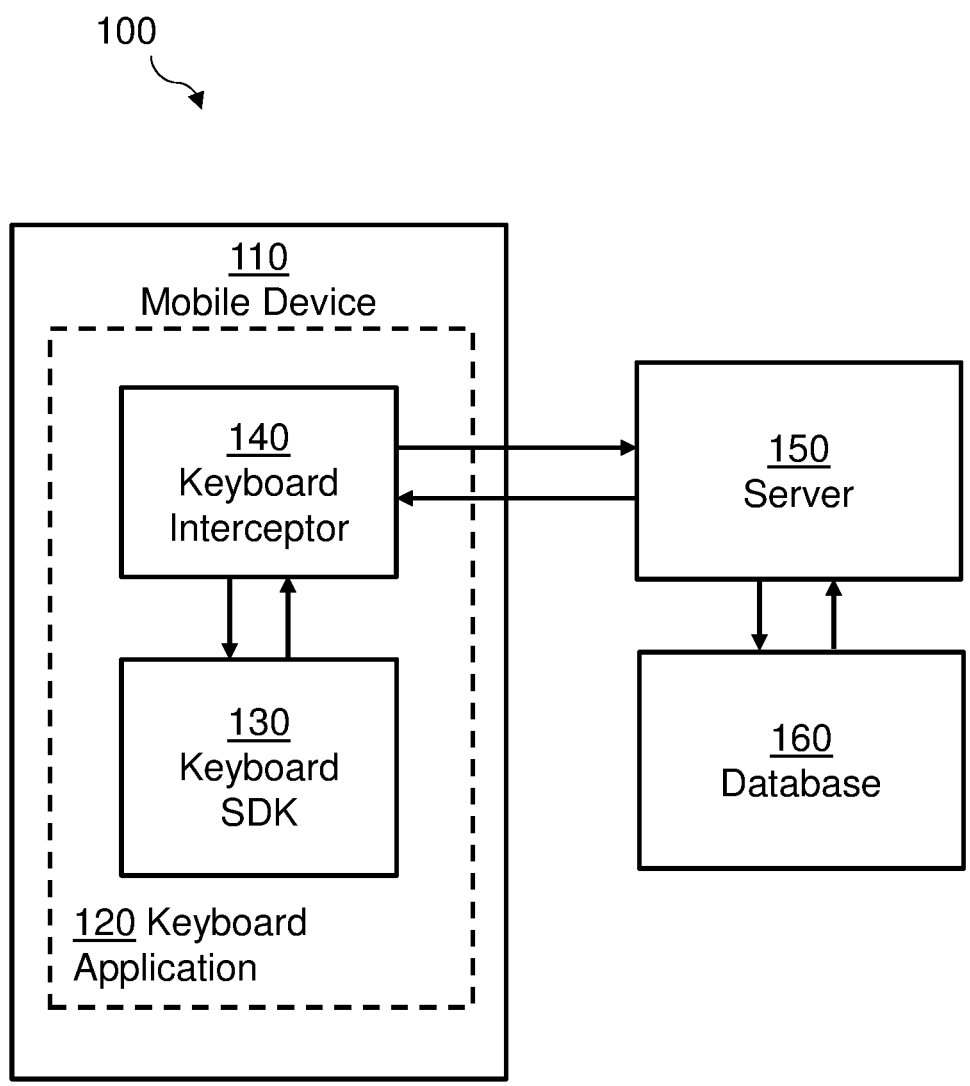
FIG. 1 illustrates schematically a system according to an example.
Figure 2:
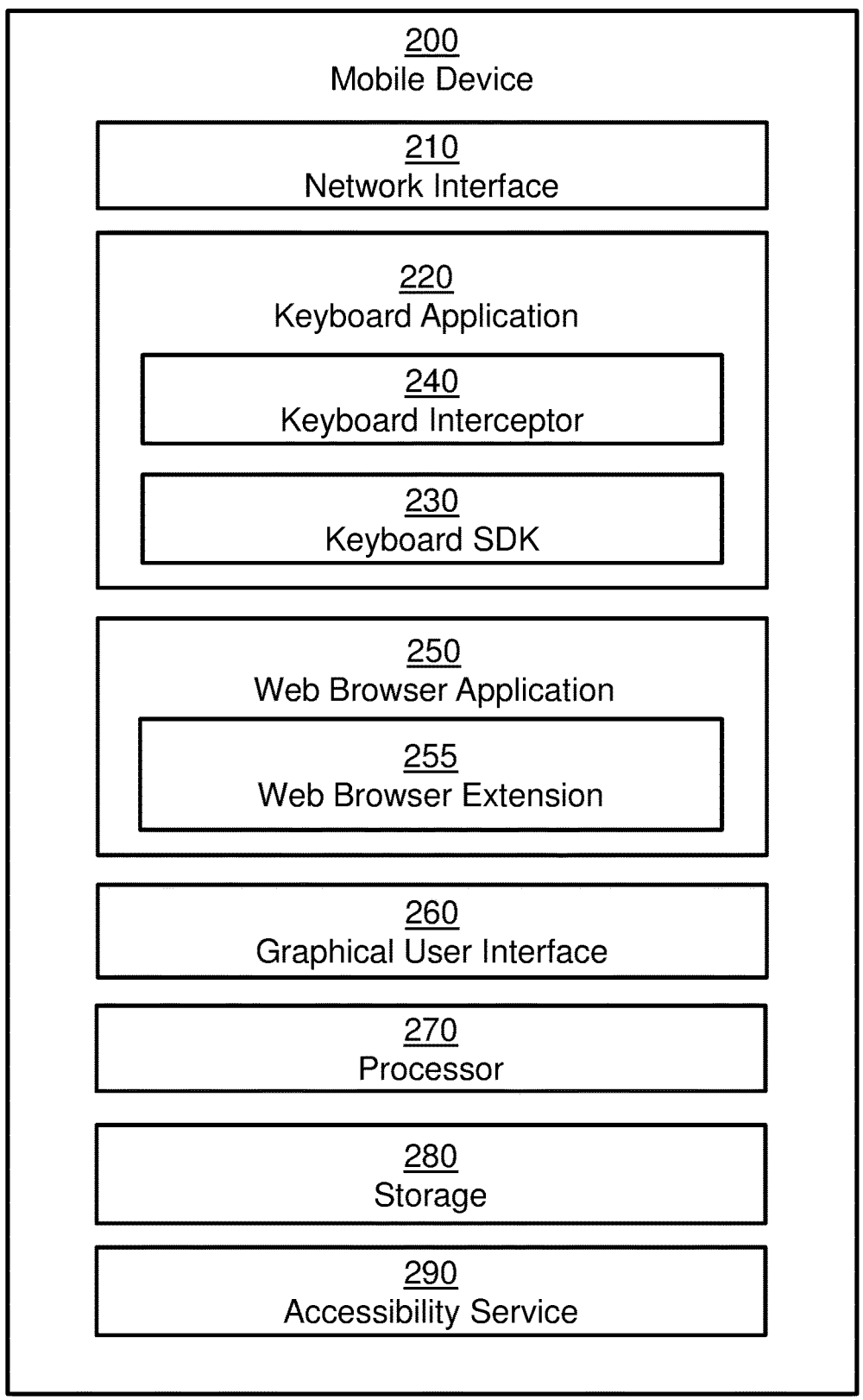
FIG. 2 illustrates schematically a mobile device according to an example.

In an example implementation of the present disclosure, a keyboard interceptor, operating on a mobile device of a user, generates a unique tracking link and passes it to a web browser application executing on the user's mobile device. This single user implementation will now be described in detail with reference to FIGS. 1-6. FIG. 1 illustrates a system 100 according to an example comprising a mobile device 110, a server 150 and a database 160. In particular, FIG. 1 illustrates how a mobile device 110 comprising a keyboard interceptor 140 can communicate with the server 150 to source data. FIG. 2 illustrates a mobile device 200 according to another example. The mobile device 110 shown in FIG. 1 may be an example of the mobile device 200 shown in FIG. 2, but without for example a web browser extension. This may be due to hardware or software limitation as discussed above, or a design choice of the provider of a web browser application.

Referring to FIG. 1, the mobile device 110 is a mobile computing device that generally supports a mobile operating system, such as a smart phone and a tablet computer. The mobile device 110 is communicatively coupled to the server 150. The server 150 is further communicatively coupled to the database 160. The database 160 stores data relating to brands, and for any given brand the data may be stored in fields of the database, the fields comprising one or more of URLs, metadata such as offers, keywords, categories, descriptions, coupon, voucher and discount codes, surveys, and media such as images, video and audio etc. relating to that brand.

The mobile device 110 comprises a keyboard application 120. Third-party, or custom, keyboards are available on mobile devices and provide an alternative to native keyboards that are included as part of the mobile operating system. Custom keyboards can be provided as a software development kit (SDK) to include within an application that acts as a container for the SDK, wherein the SDK provides keyboard functionality. Thus, a user wanting to use a custom keyboard must download an application that includes a keyboard with custom keyboard functionality. It will be appreciated that custom keyboards are not limited to those provided by an SDK but can be custom built within the mobile application itself. This functionality is detectable by the mobile operating system. The user can change input methods from the native keyboard to the custom keyboard through the settings, for example. A keyboard application, such as the keyboard application 120 in FIG. 1, will be understood to mean a container application including an SDK providing keyboard functionality. This can include custom keyboard applications as described above, or native keyboard applications. Further, an SDK providing keyboard functionality will be referred to as a keyboard SDK. The keyboard application 120 may be provided by an entity associated with the server. Alternatively, the keyboard application 120 may be provided by a third-party that differs from the entity associated with the server 150. The third-party may be an entity that provides goods and/or services in exchange for payment. For example, the third party may be a subscription service provider, a utility service provider, or a merchant selling goods. In one example, the keyboard application 120 may be provided as part of a mobile network billing application. The mobile network billing application may be downloadable from an application repository compatible with the operating system running on the mobile device 110 or may be preloaded onto the mobile device 110. The mobile network billing application may be required for a user to monitor information associated with an account registered with the mobile network. In another example, the keyboard application 120 may be provided as part of a game application. The game application may also be downloadable from an application repository compatible with the operating system running on the mobile device 110 or may be preloaded onto the mobile device 110. In a further example, the keyboard application 120 may be a native keyboard application which may be provided by the manufacturer of the mobile device 110 and/or the developer of the operating system executing on the mobile device 110.

The keyboard application 120 may allow for a user to set up an account associated with the provider of the keyboard application 120. The account may allow a user to view and track their rewards awarded through use of the keyboard application 120. The account could also be used by the user to withdraw their rewards. Withdrawing a reward may involve connecting to a payment service in order to deposit funds and/or add credits to one or more apps also on the mobile device 110.

In the example shown in FIG. 1 the keyboard application 120 enables a user to interact with the mobile device 110 through functionality provided to the keyboard application via keyboard SDK 130, which is to be understood to be an exemplary keyboard SDK having the features described above. The keyboard SDK 130 enables the keyboard application 120 to display a virtual keyboard on a touchscreen of the mobile device 110, through which a user may type characters into the mobile device 110. The characters may relate to any language and/or symbols. In another example, the keyboard SDK 130 may be operatively associated with a software component that converts speech to text for display by the keyboard application 120 via a user interface.

In embodiments described herein, the mobile device 110 further comprises a keyboard interceptor 140. The keyboard interceptor 140 is provided as part of the keyboard application 120, for example as part of a container application further comprising an SDK that provides keyboard functionality. The keyboard interceptor 140 may alternatively be provided in a separate SDK for use with a keyboard SDK 130 such as a native keyboard SDK. The keyboard interceptor 140 may be configured to monitor input via the functionality provided by the keyboard SDK 130. That is, the keyboard interceptor 140 tracks an input in the form of typed text or text resulting from speech to text etc. The keyboard SDK 130 may include an event listener application programming interface (API). The event listener API allows the keyboard interceptor 140 to receive event notifications indicating input to the keyboard by the user. In the example where a user is typing, the keyboard SDK 130 may include a specific text input monitoring API. The keyboard interceptor 140 can then communicate with the keyboard SDK 130 via the text input monitoring API to receive event notifications corresponding to text entered by the user. In a further example, the keyboard interceptor 140 may receive every event notification issued via the event listener API and determine which event notifications correspond to entered text.

The keyboard interceptor 140 may, alternatively or in addition, be configured to communicate with, and accept input from, one or more applications also present on the mobile device 110. As will be discussed in further detail with regards to FIG. 2, the mobile device 110 may also be configured with one or more or of a web browser extension associated with a web browser application, and an accessibility service. In this case, the keyboard interceptor 140 may be configured to accept a URL of a webpage being accessed by a web browser application from the web browser extension, for example. The keyboard interceptor 140 may be configured to accept current content in the graphical user interface (GUI) of the mobile device from the accessibility service, for example.

The keyboard interceptor 140 is configured to generate search queries. In an example implementation, the keyboard interceptor 140 generates a search query based on a first input entered using the keyboard application 120. The search query may be based on exact content of the first input. For example, if the first input is the text string "jon", then the search query generated by the keyboard interceptor 140 may be based on the text string "jon". In another example, the keyboard interceptor 140 may first modify the first input prior to generating the search query. For example, if the first input is the text string "jon", the keyboard interceptor 140 may modify the text string to "john", and therefore generate a search request based on the text string "john". In another example, the input is formed by analysing current content of the GUI of the mobile device 110. The current content of the GUI may be obtained from a screenshot of the GUI or via accessibility services operating on the mobile device 110. In this case, the keyboard interceptor 140 may extract information from the current content, such as text displayed within the GUI, to form the input. In a further example, the input may be formed based on information provided to the keyboard interceptor 140 via a browser extension associated with a web browser application. In this case, the input may be a domain name associated with a URL for a webpage currently being accessed by the web browser application.

The keyboard interceptor 140 then makes an API call to the server 150, causing the server 150 to locate data based on the search query. The request may be sent as a "GET" Hypertext Transfer Protocol (HTTP) request containing the text string "john". On receipt of the HTTP request, the server 150 communicates with the database 160 in order to locate data matching the entered text string (in this example "john"). As explained above, the database 160 stores data relating to brands, and for any given brand the data may be stored in fields of the database, the fields comprising one or more of URLs, metadata such as offers, keywords, categories, descriptions, coupon codes, surveys and media etc. of that brand. For each brand, the data for that brand can be linked via a unique record identifier (ID), which is generated by the server 150.

When the server 150 performs a search of the database 160 for data entries that match the entered text string, the server 150 submits a query that will be executed by the database 160 across all database entries. This may involve communicating with an external service, such as Azure™ search service. When a database entry that matches the query is located, the server 150 retrieves an above-mentioned corresponding unique record ID, and sends that unique record ID in a message to the keyboard interceptor 140 e.g. as a HTTP message. This allows the server 150 to identify entries in the database in future without having to perform a further search. The message may also include data (e.g. name of the brand, logo of the brand) retrieved from one or more of the database fields that match the search query.

In one example, the user may enter a descriptive keyword. This causes the keyboard interceptor 140 to generate a search query for the text "trainer". The server 150 then performs a search of the database 160 for entries relating to the text "trainer". In this example, the database 160 may return e.g. the brand Nike®, if that is stored in a database field in association with keyword "trainer". The message sent to the keyboard interceptor 140 may then indicate that data relating to the brand Nike® has been located based on the search term "trainer". The message also includes a unique record ID, which, as mentioned above, has been generated by the server 150.

The server 150 may provide the keyboard interceptor 140 with one or more authentication tokens as part of an initial configuration process for use by the keyboard application 120 when authenticating the keyboard interceptor to the server 140. The authentication tokens may be issued if the server 150 can determine that the user of the keyboard interceptor 140 is validly registered with the server 150. This may require the user to register an account with an entity associated with the server 150. For example, if the keyboard application 120 is associated with the same entity that is associated with the server 150, then the user may provide login details to the keyboard application 120. Successful login by the user causes the keyboard application 120 to receive an access token that can be used to authenticate communication between the server 150, and the keyboard application 120 and/or the keyboard interceptor 140. When the keyboard application 120 is not associated with the same entity that is associated with the server 150, such as when the keyboard application 120 is associated with a mobile network operator, the keyboard interceptor 140 may communicate directly with the server 150 to receive an access token. The server 150 may also issue one or more refresh tokens to the keyboard application 120 and/or the keyboard interceptor 140. The refresh tokens are configured to renew the access token and may conform to the OAuth protocol.

In either case, the authentication tokens may include information about the user. The information may include one or more identifiers associated with the user. In one example, the identifier associated with the user comprises a device ID. The device ID may be derived from the International Mobile Equipment Identity (IMEI) number of the mobile device 110, which is unique to every mobile phone device. Other examples of device ID are possible. For example, the device ID may be derived from a phone number associated with the mobile device 110. If the identifier associated with user includes a device ID, the keyboard application 120 could be associated with a mobile network operator (a mobile network billing app, for example).

Once the message comprising the unique record ID (and other data returned by the server 150 from the database 160) has been received by the keyboard interceptor 140, the keyboard interceptor 140 associates an element in the graphical user interface (GUI) with the unique record ID. For example, the keyboard interceptor 140 may display, within a user interface of the keyboard application 120, a dedicated element in the GUI. The GUI element serves to notify the user that data has been found that is relevant to what the user entered (in this example, "jon"). The dedicated GUI element may take the form of a button, text, icon, and other interactive elements. Selection of this GUI element may involve the user physically pressing on a region of a display of the mobile device 110 that is presently displaying the GUI element. Alternatively, or in addition, the keyboard interceptor 140 may associate one or more GUI elements already present in the user interface of the keyboard application 120 with the message. For example, when the message is received from the server 150 indicating that data has been located that is relevant to the search query, the keyboard interceptor 140 may associate an enter button, displayed in the user interface of the keyboard application 120, with the unique record ID.

The GUI element associated with the unique record ID may display an indication that one or more deals for the brand associated with the data are available to the user. The indication may be text notifying the user of a cashback amount rewarded for a purchase on the brand's website, if any coupon codes are available to use on the brand's website, if any surveys are available relating to the brand, or any other financial incentive associated with the brand. This may incentivise the user to visit the brand's website.

When the user selects the GUI element, the keyboard interceptor 140 receives a second input corresponding to selection of the GUI element. It is to be understood that selection of the GUI element is an input that is second to, which is to say that it follows, what the user enters in order to seed the initial search query (in this example "jon").

Selection of the GUI element causes the keyboard interceptor 140 to send a request to the server 150 comprising the unique record ID, so that the server 150 can identify the database record(s) for which data was previously retrieved and returned to the keyboard interceptor 140 in response to the search query.

In response, the server 150 retrieves the unique record ID from the message and searches the database 160 for further information associated with the unique record ID. This may comprise a redirect URL for a website associated with the unique record ID. This may also comprise one or more coupon codes and/or survey questions associated with the unique record ID. The server 150 then generates a unique tracking link, which comprises a randomly generated click ID and the redirect URL. The unique tracking link optionally additionally comprises parameters such as an Urchin Tracking module (UTM) parameter that provides tracking statistics for the redirect URL. Other types of information, such as a server identifier that identifies the server 150, may be included in the unique tracking link. The server identifier allows for any actions taken by the user on the website associated with the domain name to be attributed to the server 150 generating the unique tracking link that sent the user to the website.

The unique tracking link is then stored in the database 160 in association with the unique record ID and an identifier for the user and is sent back to the keyboard interceptor 140 as e.g. an HTTP message. The unique tracking link and or the click ID may further be stored in the database 160 in association with information related to the selection of the GUI element, such as the location of the click, the time and date of the click etc.

The keyboard interceptor 140 may pass the unique tracking link to a web browser application executing on the mobile device 110. The unique tracking link may be automatically placed into an address bar of the web browser application, thus, effectively, directing the user to the website following a single click of a GUI element. Alternatively, the unique tracking link may be inserted into the address bar, giving the user the option to follow the link, or to select a different link.

Accessing the website causes the web browser application to store a cookie generated by the website. The cookie comprises the click ID which as described above is present in the unique tracking link. The cookie provides the owner of the website the capability to monitor the user's activity while the user browses the website.

The keyboard interceptor 140 may pass the unique tracking link to a new tab of the web browser application. In this example, the keyboard interceptor 140 may cause a new tab to be opened within the web browser application so that the cookie can be stored when the new tab is opened. The keyboard interceptor 140 may then cause the new tab to be closed when the cookie has been stored. This process allows the cookie to be stored without the user being directed away from a current webpage. In another example, keyboard interceptor 140 refreshes the current webpage using the unique tracking link.

Any actions taken by the user after selecting the GUI element can be attributed to that user by reading the click ID associated with the unique tracking link. When the unique tracking link further comprises a server identifier, an entity associated with the tracking link can provide the server 150 associated with the server identifier an indication of the action taken by the user. The server 150 then compares the unique tracking link received from the entity and the stored unique tracking links. Because the click ID portions of the link will match, the server 150 can then attribute the action to a particular user. Advantageously, the form of the unique tracking link is secure because it does not contain any user information. Therefore, a third party who snoops on the user as they browse the website associated with the unique tracking link will not be able to associate the actions taken by the user with any individual.

In yet another example, the user may have entered the first and second inputs (in this example "jon" and selection of the GUI element displayed by the keyboard application 120) using an application that is not the web browser application. In this case, on selecting the GUI element, the operating system invokes the web browser application, wherein the unique tracking link is automatically placed into the address bar. In any case, passing the unique tracking link to the web browser application instructs the web browser application to access the website corresponding to the URL.

The system 100 described above and shown in FIG. 1 provides replicated functionality of desktop web browser extensions for mobile devices by means of a keyboard interceptor 140. The system 100 provides a convenient search of websites and/or deals for websites based on input either entered by the user or based on current content being accessed on the mobile device 110, and allows tracking of the user's activity on the website as a result. The tracking may be used to associate a particular activity with the user.

For example, the data within a record in the database 160 may be associated with a merchant associated with a brand, and the monitored activity may be one or more purchases made by the user after the selection of the GUI element as described above. As the cookie comprises the click ID that is assigned when the unique tracking link was generated, and because the unique tracking link is stored in association with the user identity when the unique tracking link is generated, the merchant can identify the user as being sent to their website via an action of the server 150. The merchant may therefore provide an entity associated with the server 150 a commission based on the one or more purchases. This commission may then be partially returned to the user in the form of cash-back & coupon/discount vouchers/codes.

In addition to the generation of a unique tracking link, the keyboard interceptor 140 may take one or more further actions. The one or more further actions may include inserting a coupon code into a relevant text field on the website corresponding to the URL. The relevant text field may be a text field designated for coupon codes. An example is an HTML field specifically designated to receive text in the form of a voucher code. The one or more actions may include displaying a survey to the user relating to a brand associated with the website corresponding to the URL. Such examples will be discussed in further detail below with reference to FIGS. 7A to 9.

FIG. 2 illustrates schematically a mobile device 200 according to an example. The mobile device 200 may be the same mobile device 110 of the system 100 shown in FIG. 1. The mobile device 200 is a mobile computing device that supports a mobile operating system. Example mobile devices include an iPhone® running iOS® 15 or above, the mobile operating system developed by Apple Inc. of Cupertino, United States. Other example mobile devices include mobile computing devices running the Android™ operating system developed by Google LLC of Mountain View, United States.

The mobile device 200 comprises a network interface 210, a keyboard application 220, a web browser application 250, a web browser extension 255 associated with the web browser application 250, a graphical user interface (GUI) 260, a processor 270 storage 280, and an accessibility service 290. The keyboard application 220 comprises a keyboard SDK 230 and a keyboard interceptor 240. The user interface 260 may be a touch sensitive display. The keyboard SDK 230 provides the keyboard application 220 with virtual keyboard functionality that is displayed on the GUI 260 and allows the user to provide input to the mobile device 200. The processor 270 is configured to cause the keyboard interceptor 240 to execute certain instructions.

Figure 3:
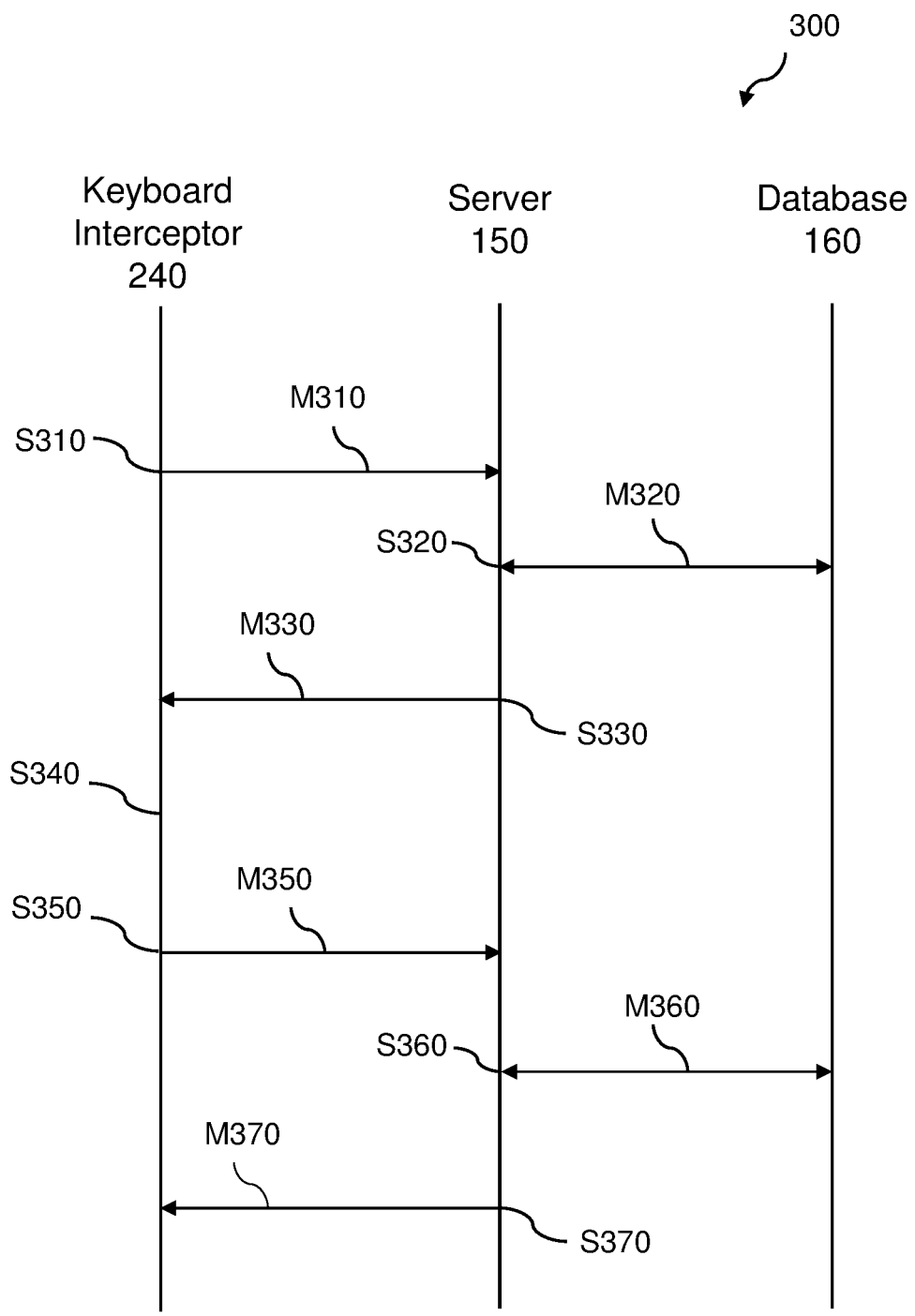
FIG. 3 shows a flow diagram illustrating a process flow according to an example.

As has been described with respect to the system 100, the keyboard interceptor 240 may track input entered by a user or receive information from one or more applications that present on the mobile device 200 such as the web browser extension 255 and the accessibility service 290. FIG. 3 is a process flow diagram illustrating the communication flow 300 between the keyboard interceptor 240, the server 150 and the database 160 according to an example implementation. At step S310, the keyboard interceptor 240 has received a first input.

In a first example, this input may be received via an event listener of the keyboard interceptor 240 as a user interacts with an application on the mobile device 200 using the keyboard application 220, as has been described above.

In a second example, the keyboard interceptor 240 includes a search bar. The search bar may be displayed whenever the keyboard application 220 is executing, or may be displayed by selecting an option within the user interface of the keyboard application 220. The search bar provides a means by which the user can directly interact with the server 150. The search bar may accept typed input using the virtual keyboard provided by the keyboard application 220 and/or accept voice input. For example, the search bar may include a selectable icon that activates a microphone of the mobile device 200 and records an audio clip. The keyboard interceptor 240 may use speech to text processing to convert any speech in the audio clip to text.

In a third example, the keyboard interceptor 240 is configured to monitor current content of a user interface of the mobile device 200. In one case, the keyboard interceptor 240 obtains the URL of a webpage of a website currently being accessed by the web browser application 250 from the current content. The current content may be obtained by taking a screenshot of the user interface of the mobile device 200 by the keyboard interceptor 240. The keyboard interceptor 240 may then perform image processing on the screenshot to determine the URL in the address bar of the mobile web browser application 250. In some instances, the full URL may be hidden in the address bar or the address bar itself may be hidden. The keyboard interceptor 240 may therefore take screenshots at a sufficient rate to obtain the URL between the instances where the full URL is hidden. The current content of the user interface may be obtained via the accessibility service 290 made available to the keyboard interceptor 240 by the operating system of the mobile device 200. The accessibility service 290 may be provided by the operating system of the mobile device 200 and comprise an autofill framework. The keyboard interceptor 240 may process the current content of the user interface obtained via the accessibility service 290 to determine the URL of the current website.

In a fourth example, the keyboard interceptor 240 may interface with the web browser extension 255, or simply browser extension 255, associated with the web browser application 250 to determine a domain name associated with a webpage currently being accessed by the web browser application 250. Some mobile web browser applications 250 support browser extensions in a similar manner to desktop web browser applications. For example, iOS® 15 has introduced the availability of browser extensions on the mobile version of Safari®. The browser extension 255 may be downloadable from an application repository compatible with the operating system running on the mobile device 200. Alternatively, or in addition, the browser extension 255 may be downloadable from within the web browser application 250. In another example, the browser extension 255 may be provided pre-installed on the mobile device 200.

The browser extension 255 may interface with the keyboard interceptor 240. In one example, the keyboard interceptor 240 registers with the browser extension 255 to allow communication between the browser extension 255 and the keyboard interceptor 240. Further, the keyboard interceptor 240 and browser extension 255 may be provided by the same entity and so the user may be able to login to the same account associated with the keyboard interceptor 240 and the browser extension 255. The login procedure may be performed via a single sign-on process, such as OAuth 2.0 or SAML, for example.

The communication between the browser extension 255 and the keyboard interceptor 240 may be via an API providing direct communication on the mobile device 200. Alternatively, or additionally, the browser extension 255 and the keyboard interceptor 240 may communicate through shared storage, such as the storage 280, wherein the browser extension 255 may store data within the shared storage that is accessible to the keyboard interceptor 240. Alternatively, or additionally, the browser extension 255 and the keyboard interceptor 240 may communicate through the server 150. This may be possible because the browser extension 255 and keyboard interceptor 240 may be provided by the same entity that is also associated with the server 150.

The browser extension 255 can then send the URL to the keyboard interceptor 240 either: directly via an API, via shared storage whereby the browser extension 255 stores the URL and the keyboard interceptor 240 accesses the shared storage to retrieve the URL, or indirectly through the server 150. The keyboard interceptor 240 may perform further processing on the URL to form the first input. For example, the keyboard interceptor 240 may extract text from the URL to form the first input.

Irrespective of how the first input is received/generated, the keyboard interceptor 240 generates a search query associated with the first input. The search query is forwarded to the server 150 via an API call M310. The API call M310 may be a "GET" HTTP request comprising the search query. As discussed above, authenticated communication between the server 150 and the keyboard interceptor 240 may be achieved via an authentication process whereby the server 150 provides one or more authentication tokens to the keyboard interceptor 240. The authentication tokens may include information about the user of the keyboard interceptor 240, such as a device ID.

As explained above, the data to be located may include data relating to brands, such as one or more of URLs, metadata such as offers, keywords, categories, descriptions, coupon codes, surveys and media etc. of that brand. When the one or more URLs are associated with a merchant, the metadata may include an indication of whether there are any active deals available to the user. As discussed above, associated data can be linked via a unique record identifier (ID), which is generated by the server 150.

The mobile device 200 can communicate with the server 150 via the network interface 210. The network interface 210 may be a wireless interface arranged to facilitate a data flow between the mobile device 200 and the server 150. The network interface 210 may further facilitate a data flow between the mobile device 200 and other remote devices, such as one or more additional servers and other mobile devices connected to the same communications network. For example, the network interface 210 may communicate with remote devices in accordance with a communication protocol. The communication protocol may be any wireless standards including IEEE 802.11a, 802.11b, 802.11g, 802.11n, or 802.15. When the network interface is a wireless interface, the network interface may include one or more radios.

At step S320, the server 150 sends a request M320 to the database 160. The request M320 causes the database to locate data matching the search query. The request M320 may be a Structured Query Language (SQL) query. The request M320 causes the database 160 to search across all database entries for data matching the search query. This may involve communicating with an external service, such as the Azure™ search service.

At step S330, the server 150 sends the unique record ID in a message M330 to the keyboard interceptor 240. The message M330 may be an HTTP message. The message M330 indicates to the keyboard interceptor 240 that data matching the search query has been found.

At step S340, in response to receiving the message M330, the keyboard interceptor 240 associates, within a user interface of the keyboard application 220, a GUI element with the unique record ID. When the keyboard application 220 is a virtual keyboard, the GUI element may be a new GUI element that is displayed in a banner directly above the user interface of the keyboard in response to receiving the message M330. The GUI element may alternatively be a character key within the virtual keyboard.

At step S350, the keyboard interceptor 240 receives the second input corresponding to the user selecting the GUI element. In response, the keyboard interceptor 240 sends a request M340 to the server 150 comprising the unique record ID. The request M350 may be an HTTP "POST" request. The request M350 may be authenticated using any authentication tokens that were retrieved as part of the authentication process described above.

At step S360, the server 150 retrieves information associated with unique record ID by sending a further request M360 to the database 160. The request M360 may be an SQL query. The unique record ID allows the server 150 to identify the database record(s) for which data was previously retrieved via the request M320. In this example the information comprises a redirect URL for a website associated with the unique record ID. As the search query may have been formed based on a detected URL, it is possible that the redirect URL may be for the same website that is currently being accessed within a web browser application. The server 150 then generates a unique tracking link comprising a randomly generated click ID and the redirect URL. The unique tracking link may be stored in the database 160 by the server 150.

The unique tracking link optionally additionally comprises parameters such as an Urchin Tracking module (UTM) parameter that provides tracking statistics for the redirect URL. Other types of information, such as a server identifier that identifies the server 150, may be included in the unique tracking link. The server identifier allows for any actions taken by the user on the website associated with the domain name to be attributed to the server 150 generating the unique tracking link that sent the user to the website.

The unique tracking link is then stored in the database 160 in association with the unique record ID. At step S370, the server 150 sends the unique tracking link to the keyboard interceptor 240 via a further message M370. The further message M370 may be an HTTP message, as discussed above.

Once the unique tracking link is available to the keyboard interceptor 240, the unique tracking link is passed to the web browser application 250. In one example, the unique tracking link may first be communicated to the web browser extension 255 and the web browser extension 255 may pass the unique tracking link to the web browser application 250 whereby to access the website. When launched, the unique tracking link provides access to the website corresponding to the URL. Accessing the website causes the web browser application 250 to store a cookie generated by the website. The cookie comprises the click ID which as described above is present in the unique tracking link. The cookie provides the owner of the website the capability to monitor the user's activity while the user browses the website.

The keyboard application 220 or web browser extension 255 may cause a new tab to be opened within the web browser application 250, and pass the unique tracking link to the new tab. The cookie may then be stored by the web browser application 250, and the keyboard application 220 or web browser extension 255 may cause the new tab to close. In this way, the user does not need to be navigated away from the current webpage, improving the user experience. In another example, the keyboard interceptor 240 or web browser extension 255 refreshes the current webpage whereby to store the cookie.

In a second example implementation, the keyboard interceptor 240 communicates with local storage via the keyboard application 220 in order to locate the data and generate the unique tracking link. In this second example, data, similar to that stored by the database 160 in the first example, may be stored locally in the storage 280. In this case, there may be an initial replication process between the database 160 and the local storage 280, whereby the data stored in the database 160 is copied to the local storage 280. The keyboard application 220 preferably regularly communicates with the server 150 to refresh the data stored locally.

In this second example, the keyboard interceptor 240 receives an input and generates a search query. To locate data, the search query is passed to the keyboard application 220. The keyboard application 220 can then perform a search of the local storage 280 to locate data matching the search query. Locating the data may involve an intermediate step of retrieving the data from cache. For example, the data may already be cached in a separate memory (not shown) and so already available to the keyboard application 220, or the data may be located in the storage 280 first and cached into the separate memory before being retrieved by the keyboard application 220. The message, comprising the record identifier, and indicating that the data has been located that matches the search query, is then passed from the keyboard application 220 to the keyboard interceptor 240, causing a GUI element displayed by the keyboard application 220 to be associated with the message. Accessing local storage instead of communicating with a remote server may speed up the process of locating data matching the search query. In this second example, when the user selects the GUI element, the keyboard interceptor 240 forwards a request to the keyboard application 220 that comprises the unique record ID. The keyboard application 220 can then forward the request to the server to generate the unique tracking link.

Figure 4:
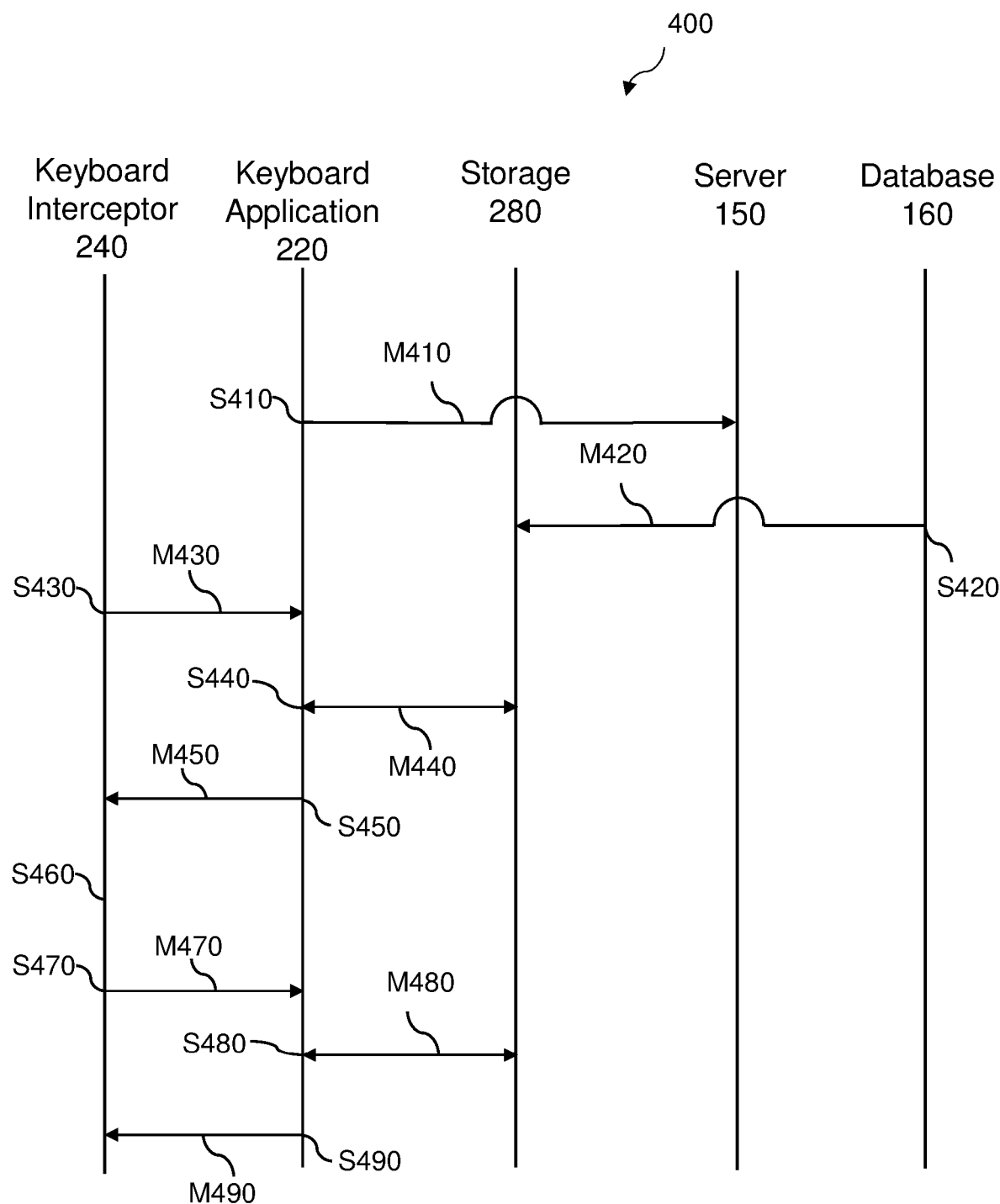
FIG. 4 shows a flow diagram illustrating a process flow according to a further example.

FIG. 4 shows a flow process diagram illustrating a communication flow 400 between the keyboard interceptor 240, the keyboard application 220, the server 150 and the database 160 according to the second example implementation. At step S410, the keyboard application 120 sends a request M410 to the server 150 requesting data stored in the database 160. This may occur as part of an initialisation process when the keyboard application 220 is first installed on the mobile device 200. In this instance, the user may be required to create, or login to, an account associated with the server 150. Said account may grant authorisation of the keyboard application 220 to communicate with the server 150.

At step S420, a data synchronisation process occurs wherein records stored on the database 160 are downloaded onto the storage 280 via a data transfer M420. The data synchronisation process may occur in response to the server 150 determining that the keyboard application 220 can validly communicate with the server 150. The data transfer may be a JavaScript™ Object Notation (JSON) data response. Once the data transfer M420 is completed, the records stored in the database 160 are now also present in the storage 280.

At step S430, the keyboard interceptor 240 receives a first input and generates a search query based on the first input. The keyboard interceptor 240 sends a request M430 comprising the search query to the keyboard application 220. The request M430 may be an API call between the keyboard interceptor 240 and the keyboard application 220.

At step S440, the keyboard application 220 communicates with the local storage 280 in order to locate data that matches the search query. The keyboard application 220 sends a request M440 to the storage requesting data that matches the search query. When data matching the search query is located, the unique record ID associated with the data is retrieved. Locating the data may involve the intermediate step of retrieving the data from cache.

At step S450, after data has been located, the keyboard application 220 sends a message M450 to the keyboard interceptor 240 comprising the unique record ID. The keyboard interceptor 240 then associates a GUI element in the user interface of the keyboard application 220 with the unique record ID.

At step S460, the keyboard interceptor 240 associates, within a user interface of the keyboard application 220, a GUI element with the unique record ID in response to receiving the message M450.

At step S470, the keyboard interceptor 240 receives a second input corresponding to the selection of the GUI element. In response to the second input, the keyboard interceptor 240 sends a request M470 to the keyboard application 220 comprising the unique record ID.

At step S480, the keyboard application 220 sends a further request M480 of the local storage 280 for information associated with the unique record ID. The unique record ID allows the keyboard application 220 to identify the record(s) for which data was previously retrieved via the request M440. The information comprises a redirect URL for a website associated with the unique record ID. The keyboard application 220 then generates a unique tracking link comprising the redirect URL and a random click ID. The unique tracking URL may be stored in the local storage 280 and/or sent to the server 150 via an HTTP message.

At step S490, the keyboard application 220 sends the unique tracking link to the keyboard interceptor 240 via a further message M490.

In a third example implementation using the mobile device 200, the keyboard interceptor 240 receives an input and generates a search query. As in the second example, the search query is passed to the keyboard application 220. In this third example, the keyboard application 220 makes an API call to a server to locate data matching the search query. The API call is similar to the API call M310, but is instead between the keyboard application 220 and the server 150. To this end, the keyboard application 220 may further comprise the necessary API functionality required to communicate with the server 150, in which case the keyboard application 220 may itself send the search query to the server 150 to locate the data. When the data is located, the message comprising the unique record ID is returned to the keyboard application 220 and delivered to the keyboard interceptor 240. The keyboard interceptor 240 then associates, within a user interface of the keyboard application 220, a GUI element with the message. In this third example, when the user selects the GUI element, the keyboard interceptor 240 makes an API call to the keyboard application 220, causing the keyboard application 220 to itself generate an API call to the server 150 for the unique tracking link. As for the other examples, this API call may be sent as an HTTP "GET" request to the server 150.

In a fourth example implementation using the mobile device 200, the keyboard interceptor 240 receives the input and generates a search query. As in the second and third examples, the search query is passed to the keyboard application 220. The keyboard application 220 then performs a search of the local storage 280 to locate data matching the search query. If data relevant to the search request is not found by the keyboard application 220, the search query is then forwarded to the server 150 via an API call, similar to the API call M310, but between the keyboard application 220 and the server 150. This might occur if relevant data is not present in the local storage 280 but is available to the server 150, because the data available to the server may be more up to date. In this fourth example, the unique tracking link may be generated by the keyboard interceptor 240 or by the keyboard application 220. Alternatively, the unique tracking link may be generated by the server 150 in response to receipt of a suitable API call originating at the keyboard interceptor 240, such as the API call M350.

In some examples, the user may be able to provide input via one or more fields of the user interface of the keyboard application. Example field types include a URL field, a password field, a text field and a numerical field. The keyboard interceptor 240 may determine that the field into which the first input is provided is a field that is designated for URLs. Alternatively, or in addition, the keyboard interceptor 240 may determine that the field into which the first input is provided is a field that is designated for searches, examples of which are text fields for search engines. In a further example, the keyboard interceptor 240 may determine that the field into which the first input is provided is neither designated for URLs nor searches. For example, the user may be composing a message addressed to a second user into a messenger application. The keyboard interceptor 240 may still be active and performing steps S310-S370 or S430-S490. In response to receiving a second input from the user corresponding to selection of the GUI element, the keyboard interceptor 240 may cause the web browser application 250 to be launched from the messenger application. The web browser application 250 may be a default web browser application.

Alternatively, the keyboard application 220 may cause any application currently being accessed to display the website associated with the URL via a system service such as Android WebView or Web Views on iOS. In this way, the unique tracking link can be launched from any application executing on the mobile device.

The keyboard interceptor 240 may cooperate with any application running on the mobile device 200 in which the user can provide input via the keyboard application 220. The keyboard interceptor 240 may detect the current application into which the user is providing input. Based on this detection, the keyboard interceptor 240 may lookup a list of applications to, or otherwise, determine whether the current application is one that is enabled for use with the keyboard interceptor 240. The list may be stored in the local storage 280 and/or in the database 160. If the keyboard interceptor 240 determines that the current application is enabled for use, then steps S310-S370 or S430-S490 may be performed. In this case, the detection of the current application may feed into forming the search query. For example, the search query may include an indication that the user is currently accessing the current application. The server 150 may then return deals that are specific to an entity associated with the current application.

On the other hand, if the keyboard interceptor 240 determines that the current application is not enabled for use, the keyboard interceptor 240 may become inactive and not perform steps S310-S370 or S430-S490. In an example, a particular mobile application may be considered to be not enabled if that mobile application is of a particular type or meets certain prespecified criteria such as being associated with data stored in the database 160. If the keyboard interceptor 240 remained active and data relating to a competitor is also stored in the database, then the user may be given an option between the brand and the competitor in their keyboard application 220.

In some examples, the keyboard interceptor 240 will debounce the search, or wait, for a predetermined amount of time after the user has finished providing the first input before generating the search query. Such debouncing may increase the efficiency of the process by reducing the number of computations that need to be performed. The predetermined amount of time may be a fixed amount of time, such as 0.3 seconds. Alternatively, the predetermined amount of time may be dynamically determined. For example, the keyboard interceptor 240 may utilise a learning algorithm in order to determine an optimal amount of time to debounce the generation of the search query based on the user's usage patterns. In this case, the predetermined amount of time to debounce the generation of the search query for a slower typer may be longer than the predetermined amount of time to debounce the search for a quicker typer. For example, an optimal amount of time to debounce the search for a fast typer would result in unnecessary additional searches for a slower typer because searches may be performed after each key stroke by the slower typer. This may result in locating domain names that are not relevant to the text that will eventually be typed, using unnecessary computational resources to do so.

In an example, the unique record ID is associated with a particular merchant, and the database 160 stores a logo and an active deal associated with the merchant, together with keywords associated with the merchant and any other metadata that may assist in identifying the merchant. The logo associated with the merchant and text indicating the active deal may be included with the unique record ID in the message returned by the server 150 to the keyboard interceptor 240. In this example the logo may be displayed within the GUI element.

As has been discussed above, because the cookie comprises the click ID that is assigned when the unique tracking link was generated, and because the unique tracking link is stored in association with the user identity when the unique tracking link is generated, any actions taken by the user when accessing the website can be linked to the user. The unique tracking link may comprise a further identifier associated with the server 150. The identifier associated with the server 150 allows the merchant to identify the server 150 that directed the user to the merchant's website. The merchant may therefore associate a commission based on the purchase with the server 150, and the user identifier enables an entity associated with the server 150 to identify the user that made the purchase. This allows the entity associated with the server to reward the user with a portion of the commission. The reward may be in the form of cashback, one or more vouchers, a charitable donation, or other financial incentive. In some examples, the reward may be specific to the entity that provides the keyboard application 220. For example, when the keyboard application 220 is a game application providing the keyboard SDK 230 and keyboard interceptor 240, the reward may be in the form of in-game currency. Knowing that the user may receive some form of reward for making a purchase on the merchant's website provides an incentive for the user to visit the merchant's website in the first place. Displaying the logo associated with the merchant and text indicating an active deal in the user interface of the keyboard application further incentivises the user to select the GUI element and visit the merchant's website. For example, displaying the logo of a merchant and text such as "up to 3.4% cashback" may direct a user to that merchant, even though the user had not initially planned on visiting that merchant's website.

In a further example, the authentication tokens used by the server 150 that allow authenticated communication between the server 150, and the keyboard application 220 and/or the keyboard interceptor 240 include a device identifier. This is particularly beneficial when the keyboard application 220 is provided by a mobile network operator or other entity that provides goods and/or services in exchange for payment. In this case, a portion of commission rewarded to the user for a purchase may be provided to user as money off or otherwise a discount of a future payment. For example, the keyboard application 220 may be a mobile network billing application associated with the mobile network operator. In this example the mobile network billing application comprises an SDK providing the keyboard functionality and a keyboard interceptor 240 described above. In this example, the keyboard interceptor 240, being part of the mobile network billing application, generates the device identifier and forwards it to the server 150. The server 150 may then return the authentication tokens that allows authenticated communication between the server 150 and the keyboard interceptor 240. In this case, the authentication tokens include the device identifier. The device identifier may be generated from at least one of: the IMEI number of the mobile device, and a phone number associated with the device. When the user subsequently makes a purchase on a merchant's website, that merchant will forward commission to the network operator. A portion of the commission can then be passed to the user e.g. as money off the user's next monthly data plan payment, or as credit where that user is on a pay as you go tariff. More generally, when the keyboard application 220 is provided by a third-party that provides goods/services in exchange for payment from the user, the merchant will forward commission to the third-party. A portion of this commission may then be passed to the user. For example, when the third-party provides a subscription service to the user, the portion of the commission passed to the user may be in the form of money off the user's next bill. In a further example, when the third-party is a goods provider, the portion of the commission passed to the user may be in the form of a voucher for money off a next purchase of said goods. In any case, the keyboard interceptor 240 generates the device identifier and forwards it to the server 150. The server 150 responsively returns authentication tokens allowing authenticated communication between the server 150 and the keyboard interceptor 240.

The server 150 may store such information as any identifiers associated with the user, a record of purchases made by that user, and rewards earned by that user.

As mentioned above, it is contemplated that the search query may return a plurality of different records. This may occur if, for example, the input entered by the user is a general term for which there are many matching records. For example, the text "trainer" may be identified as a keyword in a record associated with the merchant Nike® and in a record associated with the merchant John Lewis®. In the case where the search query returns a plurality of different records, the keyboard interceptor 240 may associate a plurality of GUI elements on the user interface of the keyboard application 220 with the respective record identifiers. The user can then select one of the plurality of GUI elements which will cause the keyboard interceptor 240 to generate a unique tracking link directed to the selected URL.

The GUI elements associated with each record/merchant may be ordered according to one or more rules. For example, the order in which the GUI elements are displayed may be determined by an entity associated with the keyboard interceptor 240. In one case, the order of the GUI elements may correspond to a sustainability score associated with the respective merchants/brands. For example, brands determined to be more sustainable may be displayed first so that a user sees these brands first. This may make it more likely that the user selects the GUI element associated with these brands.

In a further example, the keyboard interceptor 240 may cause an icon to be displayed on the user interface of the keyboard application 220. The icon may signify to the user that the keyboard interceptor 240 is currently active and available to search for data when the user begins providing input. In one example, selecting the icon may launch a custom application within the keyboard application 220. A user interface of the custom application may be displayed above the user interface of the keyboard application 220. Alternatively, the user interface of the custom application may take the place of the user interface of the keyboard application 220. Functionality provided by the custom application may be included as part of the keyboard application 220.

In one example, when the search query returns a plurality of different records, the server 150 will generate a corresponding plurality of unique record IDs, each of which is returned to the keyboard interceptor 240. Once received, the keyboard interceptor 240 will display a corresponding plurality of GUI elements, wherein each GUI element is associated with a respective unique record ID generated by the server 150. In some examples, the keyboard interceptor 240 causes an icon to be displayed in the user interface, which provides a notification indicating how many results have been located as part of the search. The notification may be in the form of a number appearing in a corner of the icon. In this way, the number may dynamically alter as the user types and the search query changes. The icon may take the place of the GUI element described above, providing a notification minimised state of the keyboard interceptor 240. In this case, an indication that relevant data has been located in the search will not immediately be shown to the user as a GUI element, but the icon will indicate that data has been found, by displaying a number, e.g. "1", in the corner of the icon, for example. When the user selects the icon, the GUI element will then be displayed. This notification functionality provides the user with the option of not displaying the GUI element in every instance, but still indicates that data has been located.

When the data is associated with merchants, the custom application may display available deals or other information associated with merchants. The available deals may be displayed without the user providing any input. In this way the user can determine which merchants are currently providing incentives before providing input. Alternatively, or in addition, the merchants displayed in the custom application may be dynamically updated as the user continues typing.

The custom application may itself present an editable GUI element, such as a text field, to the user. In this arrangement, a user typing into the editable GUI element may cause the custom application to function like the keyboard interceptor 240 described above, so that the query search and unique tracking link generation can all be performed by the mini-app.

Alternatively, or additionally, the icon displayed in the user interface of the keyboard application 220 may provide access to a settings menu when selected. The settings may allow a user to adjust one or more settings relating to the keyboard application 220. Example settings that may be adjusted include user interface of the keyboard application 220 appearance, what information relating to the located data should be displayed within the user interface of the keyboard application 220, and preferences regarding which merchants should be shown.

Figure 5A:
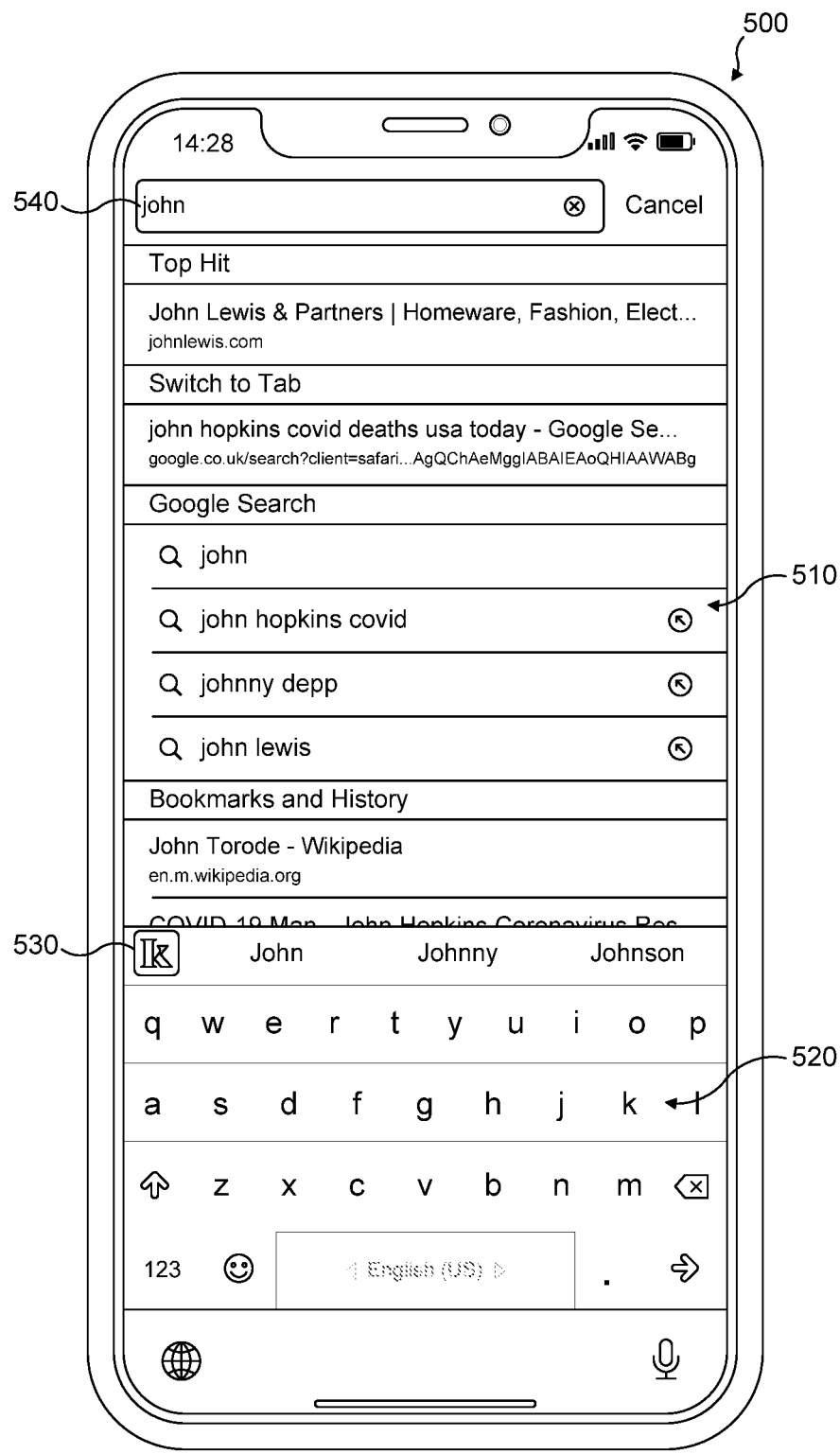
FIG. 5A illustrates a display on a mobile device according to an example.
Figure 5B:
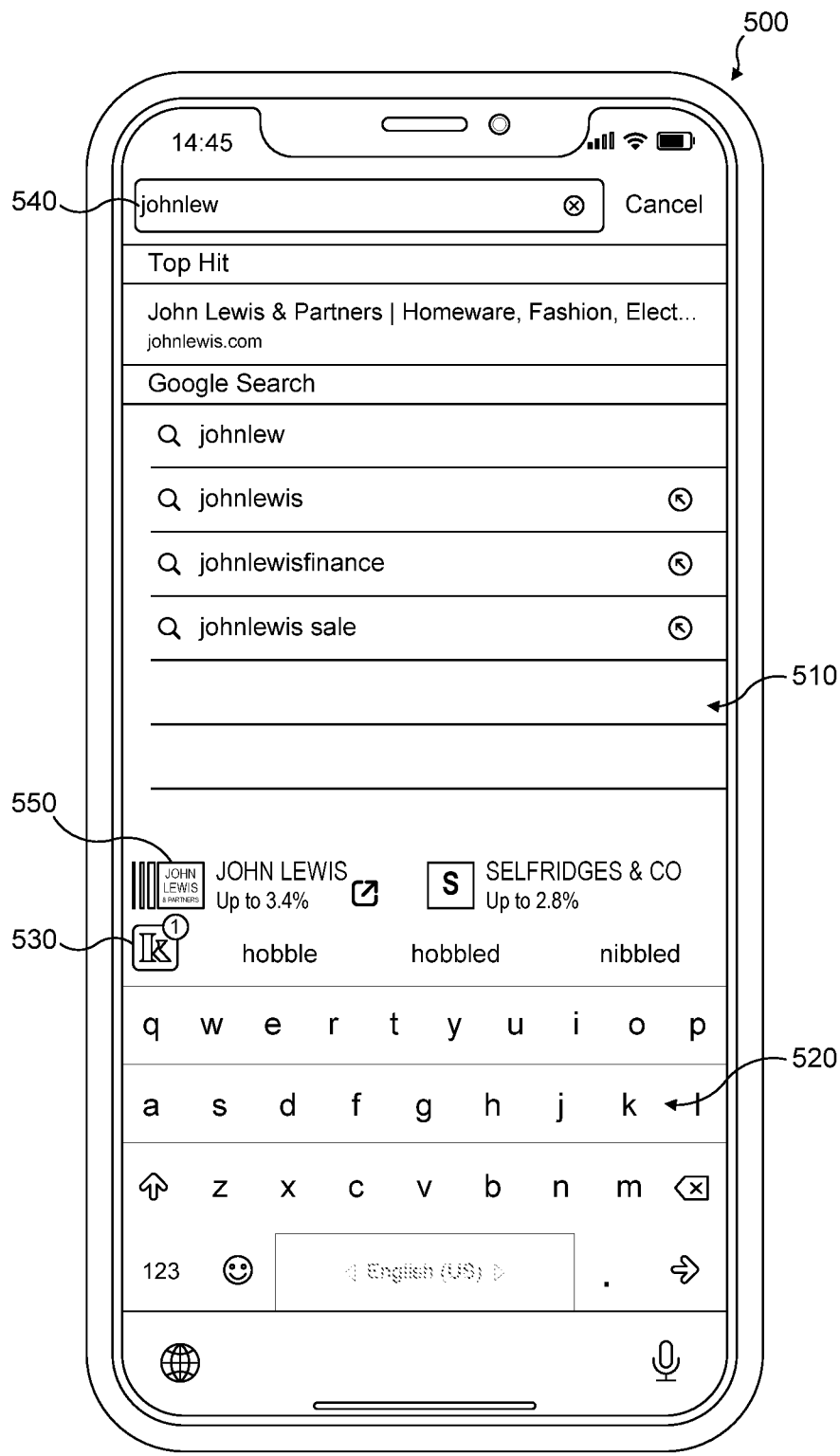
FIG. 5B illustrates the display on the mobile device according to a further example.

FIGS. 5A and 5B show an example wherein a user provides input to a keyboard application, and a unique tracking link is generated. FIG. 5A shows an example display 510 on a mobile device 500 according to an embodiment. The mobile device comprises a keyboard interceptor and keyboard application providing the afore-described keyboard functionality. The display 510 shows a user interface of a keyboard application 520 running on the mobile device 500. The user interface of the keyboard application 520 features a virtual QWERTY keyboard that allows a user to input text into the mobile device. In the example shown in FIG. 5A, text is currently being typed into a web browser application. The user interface of the keyboard application 520 includes an icon 530. The icon indicates to a user that the keyboard interceptor is currently active. The icon 530 may function as the icon discussed above with respect to the custom application. The address bar 540 of the web browser application is an example of a URL text field. A user has typed "john" into the address bar 540. As a result, the keyboard interceptor has formed a search query for the text "john", as has been discussed above.

FIG. 5B shows the display 510 on the mobile device 500 sometime after the user first started typing. The user has now typed "johnlew" into the address bar 540. As a result, a keyboard interceptor installed on the mobile device 500 has formed a search query for the text "johnlew", as has been discussed above. This has resulted in the locating of a record comprising plurality of data associated with the merchant John Lewis®. In this case, the data in the record includes a logo associated with the merchant "John Lewis", along with the text "JOHN LEWIS" and an indication of an available deal associated with the merchant. The message received by the keyboard inceptor in this example comprised the logo, text, and available deal. The keyboard interceptor has then displayed the logo 550, the text and the indication in a banner above the user interface of the keyboard application 520. The user may then select one of the logo, text and indication of the available deal in order to visit the merchant's website. As discussed above, the selection causes the keyboard application to generate a unique tracking link comprising a URL for a website associated with the merchant and an identifier associated with the user.

In the example shown in FIG. 5B, the icon 530 in the suggestion bar of the user interface of the keyboard application 520 is displaying a notification indicating that one merchant has been located. Selecting the icon 530 may activate a custom application which may display further information about the merchant as described above.

In the examples described above the keyboard application 220 is presented as a standalone application that is downloaded to a user's mobile device or as an application associated with a mobile network operator and downloaded to the user's mobile device as part of provisioning by the network operator. It is to be understood that the keyboard application 220 may be associated with any third-party application, including applications for peer-to-peer messaging and gaming. Additionally, or alternatively the functionality of the keyboard application 220—including the keyboard interceptor—may be coded into or otherwise embedded in a third-party application.

In a further example, data (e.g. deals, coupon codes, surveys, media) sourced by the server 150 may be specified or restricted by a third-party entity. For example, when the keyboard application 220 is a third-party application provided by a third-part entity, the third-party entity can determine that only certain deals should be made available to the user. In one case, the third-party entity is a merchant that would like a user to see only deals associated with themselves so as to prevent the user from potentially using a competitor merchant.

In the case where the keyboard interceptor 140 communicates with the server 150 to locate data associated with the search request, the record identifier associated with the third-party entity may be included in the search request so that the server 150 only searches for deals associated with the third-party entity. A similar process may occur in the case where the keyboard application 220 searches local storage 280 for data.

Figure 6:
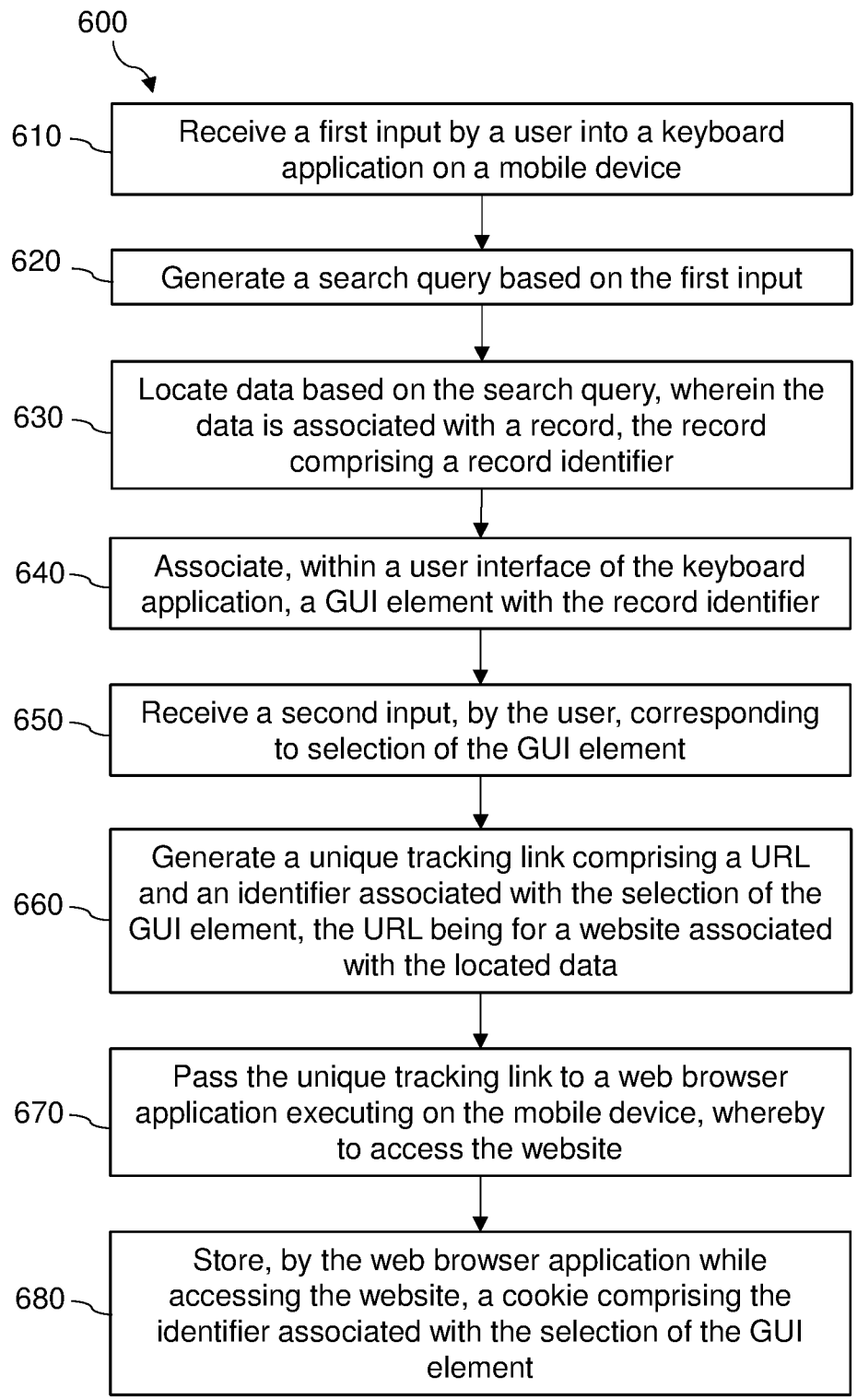
FIG. 6 a flow chart of a method according to an example.

FIG. 6 sets out, in broad terms, steps performed by a mobile device, such as the mobile devices 110, 200, and a server 150 according to the embodiments described above. At block 610, the method 600 involves receiving a first input by a user into a keyboard application 120, 220 on a mobile device 110, 200. In other examples, the first input may not be provided by a user and may be received by the keyboard application 120, 220 by other means. The keyboard application 120, 220 is an application container for a keyboard SDK 130, 230 and the keyboard interceptor 140, 240. The keyboard SDK 130, 230 provides keyboard functionality to the keyboard application 120, 220. The keyboard functionality includes at least one method of providing input to the mobile device 110, 200. The keyboard application 120, 220 may be configured to display a virtual keyboard on a display of the mobile device 110, 200, such as a virtual QWERTY keyboard, allowing the user to input text into the mobile device 110, 200. Alternatively, or in addition, the keyboard SDK 130, 230 may allow input via a speech to text procedure, whereby the keyboard SDK provides functionality to record audio as a user speaks into the mobile device 110, 200. In a further example, the keyboard SDK 130, 230 may provide functionality to allow a user to provide input by drawing on the display of the mobile device 110, 200, for example, using a stylus or a finger. In any case, the keyboard interceptor 140, 240 may receive a first input from the keyboard application 120, 220.

At block 620, the method 600 involves generating a search query based on the first input. The search query comprises the first input, for example, a user may type the text "amazon" via the keyboard application 120, 220. In this example, the keyboard interceptor 140, 240 determines that the text "amazon" has been typed and forms a search query based the text "amazon".

At block 630, the method 600 involves locating data based on the search query. As has been discussed above with respect to step S310, locating the data may be performed by making an API request M310 to a server 150 in communication with a database 160. The data stored on the database 160 is associated with a record, wherein the record comprises a unique record ID. Said data is related to brands, and for any given brand, the data may be stored in fields of the database 160. The fields may include one or more URLs, coupon codes, survey questions, other media, and metadata such as offers, keywords, categories and descriptions etc. of the brand. The data is then returned to the keyboard interceptor 140, 240 in a message M330 comprising the unique record identifier, as is shown in step S330. In a further example, as has been discussed with respect to step S440, the search query may be passed to the keyboard application 120, 220 via a message M440 which locates the data by performing a search of storage 280 of the mobile device 110, 200 for data relevant to the search query. The located data is then returned to the keyboard interceptor 140, 240 via a message M450, as shown in step S450. In yet a further example, the search query may be passed to the keyboard application 120, 220 which locates the data by forwarding an API request to the server 150. In yet another further example, the data is located in a two-step process whereby the search query is initially passed to the keyboard application 120, 220 and a search of the storage 280 of the mobile device 110, 200 is performed for data to the search query. If relevant data is found, then it is returned to the keyboard interceptor 140, 240. If relevant data is not found in the storage 280, the search query may be sent via an API request to the server, which then performs a search of the database 160.

At block 640, the method 600 involves associating, within a user interface of the keyboard application 120, 220, a GUI element with the message, as in steps S340 and S460. The GUI element may include text associated with the located data. For example, if the data found includes the text "Amazon", then the GUI element may display the text "Amazon" within the user interface of the keyboard application 120, 220. In one example, in response to receiving the data, the user interface of the keyboard application 120, 220 may further display an icon indicating that the data has been located. In response to the selection of the icon by the user, the GUI element may be displayed. The GUI element may be an existing character key within a user interface of the keyboard application 120, 220, such as an enter button.

At block 650, the method 600 involves receiving a second input, by the user, corresponding to selection of the GUI element. The selection may be achieved by the user physically pressing on a region of a display of the mobile device 110, 200 that is presently displaying the GUI element.

At block 660, the method 600 involves generating a unique tracking link comprising a URL and an identifier associated with the selection of the GUI element, in response to receiving the second input. The URL is for a website associated with the located data. In an example, the unique tracking link comprises the URL encoded with the identifier associated with the selection of the GUI element. The encoding may be achieved by appending a string associated with the identifier associated with the selection of the GUI element to the URL. The unique tracking link may be generated by making a further API request M350 to the server 150, as shown in step S350, or by passing the request M470 to the keyboard application 120, 220, as is shown in step S470. The API call M350/request M470 includes the unique record ID so that the server 150 or keyboard application 120, 220 can locate the record from which the data was located. In the case where the server generates the unique tracking link, the server sends a further request M360 to the database, as shown in step S360, in order to locate the redirect URL associated with the located data. On the other hand, when the keyboard application generates the unique tracking link, the keyboard application 120, 220 sends a further request M480 to the local storage, as shown in step S480, in order to locate the redirect URL. Alternatively, the keyboard application may send its own API request to the server, requesting generation of the unique tracking link.

At block 670, the method 600 involves passing the unique tracking link to a web browser application 250 executing on the mobile device 110, 200, whereby to access the website. When the unique tracking link is generated, it is passed to a web browser application 250 on the device 110, 200. In one example, the keyboard application 220 may cause a new tab to open in the web browser application 250 and the unique tracking link is passed to the new tab. In an example, the unique tracking link may be passed to the web browser application 250 via a web browser extension 255. In this case, the web browser extension 255 may open a new tab within the web browser application 250 and pass the unique tracking link to the new tab.

If the user is not currently within a web browser application 250, the default web browser application of the mobile device 110, 200 may be launched and execute the unique tracking link to navigate to the web site. Launching the default browser from outside of a web browser application 250 allows the method 600 to provide a shortcut to a website, while allowing tracking within the website. The unique tracking link may be sent from the server 150 to the keyboard interceptor 140, 240 via a message M370, as shown in step S370. Alternatively, the unique tracking link may be sent from the keyboard application 120, 220 to the keyboard interceptor 140, 240 via a message M490, as is shown in step S490.

At block 680, the method 600 involves storing, by the web browser application 250 while accessing the website, a cookie comprising the identifier associated with the selection of the GUI element.

The method 600 provides an enriched personal browsing experience on a mobile device by overcoming a lack of available web browser extensions on some mobile web browsers. The method 600 does this by providing an alternative to web browser extensions that utilises a keyboard interceptor. The operation of the keyboard interceptor enhances the functionality of a standard keyboard application by providing an automatic search option for URLs and keywords associated with URLs based on user input, and automatically generating unique tracking links that allow the user's activity to be tracked on a website. As discussed above, this is particularly useful when the domain name corresponds to a merchant.

In yet another example, the unique tracking link may not include an identifier associated with the selection of the GUI element. In this case, the operation of the keyboard interceptor provides search functionality without subsequent tracking.

In yet another example, the unique tracking link generated at step S360 in communication flow 300 may be a redirect link comprising a randomly generated click ID, an identifier of a brand, and a URL for a domain associated with an entity also associated with the server 150 instead of a URL for a website associated with data located in the database 160. The domain may be hosted by, or in communication with, an intermediary server (not shown) that is coupled to the server 150. The identifier of a brand may be a record ID associated with data located in step S320. In this example, upon launching of the redirect link in the web browser application 250, the user is directed to the intermediary server, which communicates with the server 150 to determine an appropriate website to which to direct the user. The intermediary server then generates a further unique tracking link comprising a URL for the appropriate website and the click ID previously generated. The user is then directed to the appropriate website and tracking of any user activity can be performed, as described above.

In a modification of this example, the redirect link generated at step S360 may not contain a click ID, and instead only comprise the URL of the domain hosted on the intermediary server and an identifier of a brand (record ID etc.). In this example, the redirect link may be termed a generic link because it does not contain a click ID. The user may have an identifier stored on their mobile device 200 which identifies the user to the intermediary server. In one example, the identifier is a cookie stored in the web browser application 250 and downloaded when the user previously visited the intermediary server. In other examples, this identifier may be stored in local storage 280 and generated in an initial configuration of the keyboard interceptor 240 and/or keyboard application 220, amongst other examples. When the browser navigates to the domain, the intermediary server identifies the user from the identifier and communicates with the server 150 to generate a unique tracking link comprising a URL for a website associated with the brand, and a click ID.

Peer-to-Peer Communication Implementation

In a further example implementation of the present disclosure, a link may be generated by a keyboard interceptor operating on a mobile device of a first user and sent, via a communications application, to one or more second users.

For example, with reference to block 680 of the method 600 described above, when a first user is currently in a messaging application, the generated unique tracking link may be pasted into a text field of the messaging application. The first user may then send a message to a second user, wherein the message comprises the unique tracking link. The second user may then select the unique tracking link. Any resulting activity of the second user may then be attributed to the first user. This is useful when the unique tracking link is associated with a merchant. Any purchases made by the second user on the merchant's website will be attributed to the first user. The first user may then receive a reward based on the purchase by the second user.

In general terms, the keyboard interceptor 240 operating on the device of the first user may be configured to allow the insertion of a link into a communication from the first user to one or more second users. In the following passages of the disclosure, the first user will be referred to as the sender, and the second user(s) will be referred to as the recipient(s). The sender's mobile device 200 comprises the keyboard interceptor 240.

The recipient(s) is/are identifiable to an entity associated with the server 150 via the intermediary server discussed above. For example, the recipient(s) may have the keyboard interceptor 240 installed on their mobile device 200 and may have previously visited the intermediary server through an action of their keyboard interceptor 240. By "visited" it is to be understood that a link has previously been accessed via the keyboard interceptor 240, causing the keyboard interceptor 240 to send a message to the intermediary server e.g. via a bespoke API, causing the intermediary server to download a cookie to the recipient's device, for use in identifying the recipient to the intermediary server. For example, the recipient may be a user who has utilized the keyboard interceptor 240 in accordance with the "Single User Implementation" described above, in particular for a case in which the Single User Implementation involves use of an intermediary server. In such implementations a cookie corresponding to the intermediary server may have been downloaded to the recipient's web browser application. As an alternative to a cookie, the bespoke API may cause the intermediary server to send, and the web browser application to store, the identifier for the user that is stored in the database 160 in association with the unique record ID when generating the unique tracking link (steps S360, S370).

As a further alternative, or in addition, the recipient(s) may have an application installed on their mobile device 200 comprising an SDK associated with the entity also associated with the server 150. An identifier identifying the recipient to the intermediary server may have been generated and stored on the recipient's mobile device 200 as part of an initial configuration of the application.

In any of these example implementations the result is that an identifier (cookie, or non-cookie) is stored locally for use in identifying the recipient to the intermediary server when the recipient accesses a link that it receives from a sender, as will now be described.

The keyboard interceptor 240 on the sender's mobile device 200 may first determine that the sender is currently providing input into a communications application. A communications application is any application which can be used by the sender to communicate with the one or more recipients. Examples include, but are not limited to, text messaging applications, email applications, messenger applications such as Facebook® Messenger, WhatsApp®, Snapchat®, social media applications such as Facebook®, Instagram®, YouTube®, Twitter® and LinkedIn. The communications application may be a web browser application into which the first user is communicating with one or more recipients using a web-based messenger service or a posting on a website, for example. Types of communications include, but are not limited to text messages, emails, messenger application messages, social media posts, website postings, YouTube® description postings and browser-based communications.

To determine that the sender is currently providing input into a communications application, the keyboard interceptor 240 may detect the current application type and/or determine that the sender is providing input into a field associated with a communication, which may involve determining that the field is a not one of a URL, browser, or search field.

When it is determined that the sender is providing input into a communications application, steps S310-S350 or S430-S470 may be performed as described above with regards to FIGS. 3 and 4. However, in this further embodiment, at step S360 (or step S480), a generic link is generated comprising: a URL for a domain hosted by an intermediary server coupled to the server 150, and an identifier of a brand, such as a record identifier, as discussed above. The generic link directs to the domain associated with an entity also associated with the server 150, instead of to a website associated with a brand in the database 160. The generic link may be generated either by the server 150 or the keyboard application 220, depending on the particular implementation, as described above with respect to the communication flows 300 and 400.

At steps S370 and S490, the generic link is passed to the sender's keyboard interceptor 240, which inserts the generic link into the communication. The sender may at first be provided with the generic link, as a paste item for example, so that they may insert the link into multiple communications with ease. Alternatively, or in addition, the keyboard interceptor 240 may automatically insert the link into the current communication. The sender may then send the communication comprising the generic link to the one or more recipients.

A recipient of the communication may click on the generic link, which launches a default web browser application installed on the recipient's mobile device 200, and directs the recipient to the domain on the intermediary server. When the keyboard interceptor 240 is installed on the recipient's mobile device 200 (i.e. included within a keyboard application 240 installed on the mobile device 200), and/or the recipient has previously visited the domain, then the recipient will be identifiable to the intermediary server through the identifier as discussed above. This identifier may be a cookie previously downloaded to the recipient's web browser application through previous interaction between the recipient and the intermediate server, or some other identifier stored on the recipient's mobile device 200 and which is accessible to the intermediary server. The intermediary server may have access to the user identity that has been assigned to the recipient by the server 150. Thus, the entity associated with the domain may identify the recipient by the user identity in the identifier.

The intermediary server may direct the recipient to a website associated with the brand via a further link, alternatively referred to below as a redirect link. This may be performed automatically by the intermediary server so that the recipient may not even be aware that they have been redirected to the intermediary server. Alternatively, the domain may include a webpage providing details of the website associated with the brand. The webpage may provide the recipient with an interactive GUI element, with which the recipient can interact in order to be directed to the website associated with the brand.

If the user presses the GUI element, then the intermediary server generates the further link. The further link comprises a URL for the website associated with the brand and an identifier of the server 150 so that any actions performed by the recipient, after being redirected to the website associated with the brand, can be attributed by the server 150. Thus, any commission earned by an action of the recipient on the website, for example a purchase, may be logged by the entity associated with the server 150.

The intermediary server may communicate with the server 150 to generate a unique tracking link comprising a URL for the website associated with the brand, a randomly generated click ID and an identifier of the server. The unique tracking link may then be stored by the server 150 in association with the recipient's user identity, as described above. Including the click ID in the unique tracking link allows any action of the recipient to be tracked. In this case, the recipient may receive commission earned by any actions performed on the website.

If, on the other hand, the recipient is not identifiable to the intermediary server, for example if the recipient does not have the keyboard interceptor 240 installed on their mobile device, then the domain still directs the recipient to the website associated with the brand via a further link comprising a URL of the website associated with the brand and an identifier of the server 150. The difference is that this recipient is not identifiable, and as a result any commission earned by an action performed by the recipient is simply associated with the entity associated with the server 150.

In some examples, the search query based on the first input by the sender may match a plurality of records in the database 160. For example, if the sender types "Nike" into a communication, then the server 150 may identify records for both the brand "Nike" and a merchant that sells Nike® products. When a recipient clicks a received generic link, at least one of the keyboard interceptor 240 on the recipient's mobile device 200 (if present) and the intermediary server may detect a current geographical location of the recipient. Based on the determined geographical location, the intermediary server, in communication with the server 150, may identify the best commission rate from the plurality of results identified in the database 160, and generate a link comprising a URL of a website associated with the result offering the best identified commission.

In a further example, the redirect link generated by the sender includes a randomly generated click ID. The click ID may be generated and stored in association with the sender's user identity as has been discussed above. When the redirect link is sent to the recipient, and the recipient clicks on the redirect link, the recipient is directed to the domain associated with the entity also associated with the server 150. In this case, the intermediary server communicates with the server 150 to generate a unique tracking link comprising a further randomly generated click ID. The click ID and the further click ID may be stored in association with one another. The intermediary server then redirects the recipient, via the unique tracking link, to a website. In this case, any action performed by the recipient on the website may be attributed to both the sender and the recipient by the server 150 via the association between the click ID and the further click ID. For example, the recipient(s) may have the keyboard interceptor 240 installed on their mobile device 200 and may have previously visited the intermediary server through an action of their keyboard interceptor 240 as discussed above. In this case, a cookie may have been downloaded to the recipient's web browser application as discussed above. Alternatively, or in addition, the recipient(s) may have an application installed on their mobile device 200 comprising an SDK associated with the entity also associated with the server 150. The identifier may have been generated and stored on the recipient's mobile device 200 as part of an initial configuration of the application. In any case, the identifier identifies the recipient to the intermediary server.

The above-described examples involving insertion of a link into a communication from a first user to one or more second users may be considered to embody the following features:

First, a method to be performed by a mobile device of a first user, the method comprising: receiving, by a keyboard application operating on a mobile device associated with the first user, a first input; generating, by the keyboard application, a search query based on the first input; locating data based on the search query, wherein the data is associated with a record stored in a database, the record comprising a record identifier; associating, within a user interface of the keyboard application, an element of a graphical user interface, GUI, of the first mobile device, with the record identifier; receiving, by the keyboard application, a second input by the first user, corresponding to selection of the element of the GUI; responsive to receiving the second input, generating a link comprising a URL and the record identifier, the URL being for a domain hosted by an intermediary server; generating a message comprising the link and sending, by a communications application operating on the mobile device, the message to a second user.

Second, a method to be performed by a mobile device of a second user in co-operation with the method performed by the mobile device of the first user, this method comprising: receiving, by a communications application operating on a mobile device of the second user, a message containing a link comprising a URL associated with a domain hosted by an intermediary server and a record identifier identifying a record stored in a database, the message originating from a mobile device of a first user; receiving an input, by the second user, corresponding to selection of the link in the message; passing the link to a web browser application executing on the mobile device of the second user, whereby to access the domain hosted by the intermediary server; generating a unique tracking link comprising a URL for a website associated with the record identifier, and an identifier associated with the selection of the link; redirecting, by the intermediary server, the second user to the web site; and storing, by the web browser application on the mobile device of the second user while accessing the website, a cookie associated with the selection of the link.

As mentioned above the communications application may be one of: Facebook® Messenger, Instagram®, WhatsApp®, Snapchat®, Facebook®, YouTube®, Twitter®, LinkedIn, and a web browser application executing one of: a web-based messenger service, and a website permitting postings by the first user. Locating the data may include forwarding an application programming interface, API, call to a server. Generating the link may comprise forwarding a further API call to the server requesting the link, the further API call comprising the record identifier. Alternatively, locating the data may include performing a search of a local storage of the first mobile device. Responsive to passing the link to a web browser application executing on the mobile device of the second user, the intermediary server may determine that an identifier identifying the second user to the intermediary server is present on the mobile device of the second user. Generating the unique tracking link and the redirecting the second user to the website may be performed automatically by the intermediary server. Alternatively, the domain hosted by the intermediary server may display a webpage comprising a further GUI element, and generating the unique tracking link is responsive to receiving, by the second user, a selection of the further GUI element. The identifier associated with the selection of the link may be randomly generated. The data may be merchant data, and the URL for a website associated with the record identifier may be a redirect URL for a website associated with the merchant. The merchant data may further comprise: a logo associated with the merchant; and an active deal associated with the merchant, and the associating the element of the GUI with the record identifier may comprise displaying the logo associated with the merchant and text indicating the active deal.

The identifier identifying the second user to the intermediary server may be a cookie or other identifier stored by the web browser application in a previous visit to the domain.

In yet a further embodiment, the link generated by the sender to be inserted into a message to one or more recipients may be a unique tracking link, generated as described above. The unique tracking link comprises a URL for a website associated with located data and an identifier associated with the selection of a GUI element on the mobile device of the sender, such as a randomly generated click ID. In this embodiment, once the unique tracking link is available to the keyboard interceptor 240, the unique tracking link may be inserted into the message. The unique tracking link may be inserted automatically by the keyboard interceptor 240 and/or made available to the sender to insert the link manually into the communication. The communication is then sent by the sender to one or more recipients. Upon receiving the communication, a recipient may select the unique tracking link which launches a default web browser application executing on the recipient's mobile device and be directed to the web site associated with the located data. The cookie may comprise the identifier associated with the selection of the GUI element, which may be stored by the web browser application and used to track the recipient's actions on the website.

Advantageously, the inclusion of the identifier associated with the selection of the GUI element, such as a randomly generated click ID, provides improved security because the unique tracking link does not contain any user information, and so no user information is communicated between users and/or passed to the website. A third party who intercepts the communication or snoops on a recipient as they browse the website associated with the unique tracking link will not be able to associate the actions taken by the recipient with any individual.

The server 150 compares the unique tracking link received from the entity and the stored unique tracking links; more specifically, the server 150 compares the click ID in the unique tracking link with the identifier associated with the selection of the GUI element portions, this having been stored by the server 150. Because the identifier associated with the selection of the GUI element portions of the link will match, the server 150 can then attribute the action to a particular user. Thus, in one example, any commission earned on a purchase made by a recipient can be credited to the sender. The unique tracking link may further comprise a server identifier that identifies the server 150. In this example, an entity associated with the website in the unique tracking link can provide the server 150 associated with the server identifier an indication of the action taken by the recipient.

The above-described example involving insertion of a unique tracking link into a communication from a first user to one or more second users may be considered to embody the following features:

First, a method to be performed by a mobile device of a first user, the method comprising: receiving, by a keyboard application operating on a mobile device associated with the first user, a first input; generating, by the keyboard application, a search query based on the first input; locating data based on the search query, wherein the data is associated with a record stored in a database, the record comprising a record identifier; associating, within a user interface of the keyboard application, an element of a graphical user interface, GUI, of the first mobile device, with the record identifier; receiving, by the keyboard application, a second input by the first user corresponding to selection of the element of the GUI; responsive to receiving the second input, generating a unique tracking link comprising a URL and an identifier associated with the selection of the GUI element, the URL being for a website associated with the located data; and generating a message comprising the unique tracking link and sending, by a communications application operating on the mobile device, the message to a second user.

Second, a method to be performed by a mobile device of a second user in co-operation with the method performed by the mobile device of the first user, this method comprising: receiving, by a communications application operating on a mobile device of the second user, a message containing a unique tracking link comprising a URL for a website associated with data located in a database and an identifier associated with selection of a GUI element on a mobile device of a first user, the message originating from the mobile device of the first user; passing the link to a web browser application executing on the mobile device of the second user, whereby to access the website; and storing, by the web browser application operating on the mobile device of the second user, while accessing the website, a cookie associated with the link.

As mentioned above, the communications application may be one of: Facebook® Messenger, Instagram®, WhatsApp®, Snapchat®, Facebook®, YouTube®, Twitter®, LinkedIn, and a web browser application executing one of: a web-based messenger service, and a website permitting postings by the first user. Locating the data may include forwarding an application programming interface, API, call to a server. Generating the unique tracking link may comprise forwarding a further API call to the server requesting the unique tracking link, the further API call comprising the record identifier. Alternatively, locating the data includes performing a search of a local storage of the first mobile device. The unique tracking link may comprise the URL encoded with the identifier associated with the selection of the GUI element. The data may be merchant data, and the URL is a redirect URL for a website associated with the merchant. The merchant data may further comprise: a logo associated with the merchant; and an active deal associated with the merchant, and the associating the element of the GUI with the record identifier may comprise displaying the logo associated with the merchant and text indicating the active deal. The cookie may allow the merchant to determine that a purchase has been made by the second user. The first user may receive a reward issued by the merchant in response to the purchase made by the second user. The method may further comprise, responsive to receiving the data, displaying an icon within a user interface of the keyboard application indicating that the data has been located; receiving a further input, by the first user, corresponding to selection of the icon, wherein displaying the element of the GUI may be responsive to receiving the further input. The identifier associated with the selection of the GUI element may be randomly generated.

The present disclosure has so far described a keyboard interceptor 240 that generates unique tracking links that direct a user to a website associated with a URL and allows the tracking of activity while browsing that website. The operation of the keyboard interceptor 240 is however not limited to the generation of unique tracking links. A keyboard is one of the most frequently used functions of a mobile device, and can be used in conjunction with almost any application running on the mobile device. The keyboard interceptor 240 can therefore be used to enable interactions beyond the above-described tracking of browser-based interactions via unique tracking links.

In one example, data from one or more additional fields of the database 160 may be passed to the keyboard interceptor 240 and displayed to a user. The keyboard interceptor 240 may further allow input beyond selection of GUI elements displayed in the user interface of the keyboard application 220. In another example, the keyboard interceptor 240 may be configured to receive and/or otherwise identify content such as one or more of text, images, video and audio, and communicate the received content to a third party. This allows interactions between the user and the third party so that the user can create a keyboard account, complete surveys and upload media indicating a proof of purchase, for example. These further examples will be described below.

As has been discussed above, the database 160 comprises data stored in fields, the fields comprising one or more of URLs, coupon, voucher, and discount codes, data such as offers, keywords, categories and descriptions etc. of that brand, and media such as images, audio and video associated with a brand. In further examples of the present disclosure, the keyboard interceptor 240 is configured to perform one or more actions relating to data stored in the fields of the database 160. The one or more further actions may be in addition, or as an alternative, to the generation of a unique tracking link.

Coupon Codes

In a further example of the present disclosure, the keyboard interceptor 240 is configured to form a search query for, receive, and insert, one or more coupon codes into a relevant text field within a webpage. The term coupon code is understood to refer to any code that affects at least one aspect of a purchase. For instance, a coupon code may activate one or more deals associated with a purchase item when input into a webpage associated with the purchase item. Therefore, the terms coupon code, voucher code and discount code are synonymous, and should all be understood to refer to such codes. The deals can include a percentage reduction in the price of one or more purchase items, a fixed price reduction in the one or more purchase items, one or more free items, and one or more services relating to the one or more purchase items such as free shipping etc. Other examples of deals that affect at least one aspect of a purchase are envisaged. In some examples, the deals described above in relation to the generation of a unique tracking link are coupon codes.

In a first example, the method 600 may be applied for the case where one or more coupon codes may be sourced and inserted into a webpage in addition to the generation of a unique tracking link.

For instance, at block 630, the data located based on a search query may include one or more coupon codes, and may additionally comprise metadata relating to the coupon code(s), such as a reward associated with use of the code(s). As discussed previously, the data may be stored locally on the mobile device 200 or in the database 160 coupled to the server 150.

At block 640, the GUI element associated with a record identifier may display an indication that one or more coupon codes are available to use on a website associated with the brand. In one example, the indication includes text stating a number of coupon codes that are available. This may further incentivise the user to visit the brand's website.

In another example, the GUI element may include a further interactive element that allows a user to obtain further information on the located data. The further interactive element may be displayed within the GUI element. For example, the further interactive element may be displayed as an "i" positioned within the GUI element. A selection of the further interactive element will not immediately cause the method to proceed to block 650 (this is not a second input within the meaning of the method 600). Instead, a selection of the further interactive element will display additional data associated with the brand, such as an indication of whether any coupon codes are available. The additional data may also have been communicated to the keyboard interceptor 240 at steps S330 or S340. The indication of available coupon codes may include one or more of the coupon code itself, the deal associated with the coupon code, and text asking whether the user would like to copy the code and proceed to a website associated with the brand. The result of the selection of the further interactive element may result in the display of one or more further GUI elements. The one or more further GUI elements may be displayed above the GUI element, and themselves display the additional data associated with the brand. Each further GUI element may correspond to a separate coupon code, and therefore may display the additional data such as the coupon code itself and the deal associated with use of the coupon code.

At block 650, a second input by the user is received corresponding to the selection of the GUI element (or a further GUI element). Based on the above discussion, the second input now corresponds either to the selection of the GUI element displaying an indication that one or more coupon codes are available, or the selection of a further GUI element, displayed in response to a user's selection of a further interactive element.

At block 660, in addition to the generation of a unique tracking link, the selection of the GUI element may also cause one or more further actions. In one example, the selection of the GUI element causes a coupon code to be passed into a text field.

Alternatively, or in addition, the selection of the GUI element at block 650 may cause the available coupon code(s) to be stored so that they are accessible to the keyboard interceptor 240. The coupon codes may be stored locally, for example in a clipboard, local storage or in cache, and/or by the server 150. The clipboard may be a feature of the keyboard application 120 and/or a feature of the operating system of the mobile device 110. In this case, when the user is accessing the application, the coupon code is available to the user to insert into the relevant text field (e.g. a coupon code field). The coupon code may be displayed within the user interface of the keyboard application 120, and be pasted into a desired text field following selection by the user. When the application is a web browser application, as a user is browsing a website associated with the URL, the keyboard interceptor 240 may detect that the user has selected a text field within the current webpage and cause the available coupon code(s) to be displayed within the user interface of the keyboard application 220 for selection by the user. Furthermore, the keyboard interceptor 240 may detect the type of text field currently being selected before causing the coupon code(s) to be displayed. In particular, the keyboard interceptor 240 may determine that the selected text field is a text field designated for coupon codes. This will be discussed with regards to FIG. 10.

The detection of the coupon code text field may cause a selectable element to be displayed in the user interface of the keyboard application 220. The selectable element may indicate that one or more coupon codes are available for use on the current website. Selection by the user of the selectable element may then cause the one or more coupons to be displayed to the user for insertion into the text field.

Some mobile operating systems, web browser applications or websites may not define a specific coupon code text field. The keyboard interceptor 240 may then cause the display of the coupon codes whenever the selection of a generic text field is detected. In such cases (when a specific coupon code field is not defined) certain defined text fields that are defined may be filtered out, such as password, email, address, and browser bar fields. By eliminating these defined, and non-coupon, fields, it becomes more likely that the remaining, non-defined, fields are for coupon code(s). This filtering may occur when a user is currently within a web browser application 250.

Figure 7A:
FIG. 7A illustrates a display on a mobile device according to yet a further example.
Figure 7B:
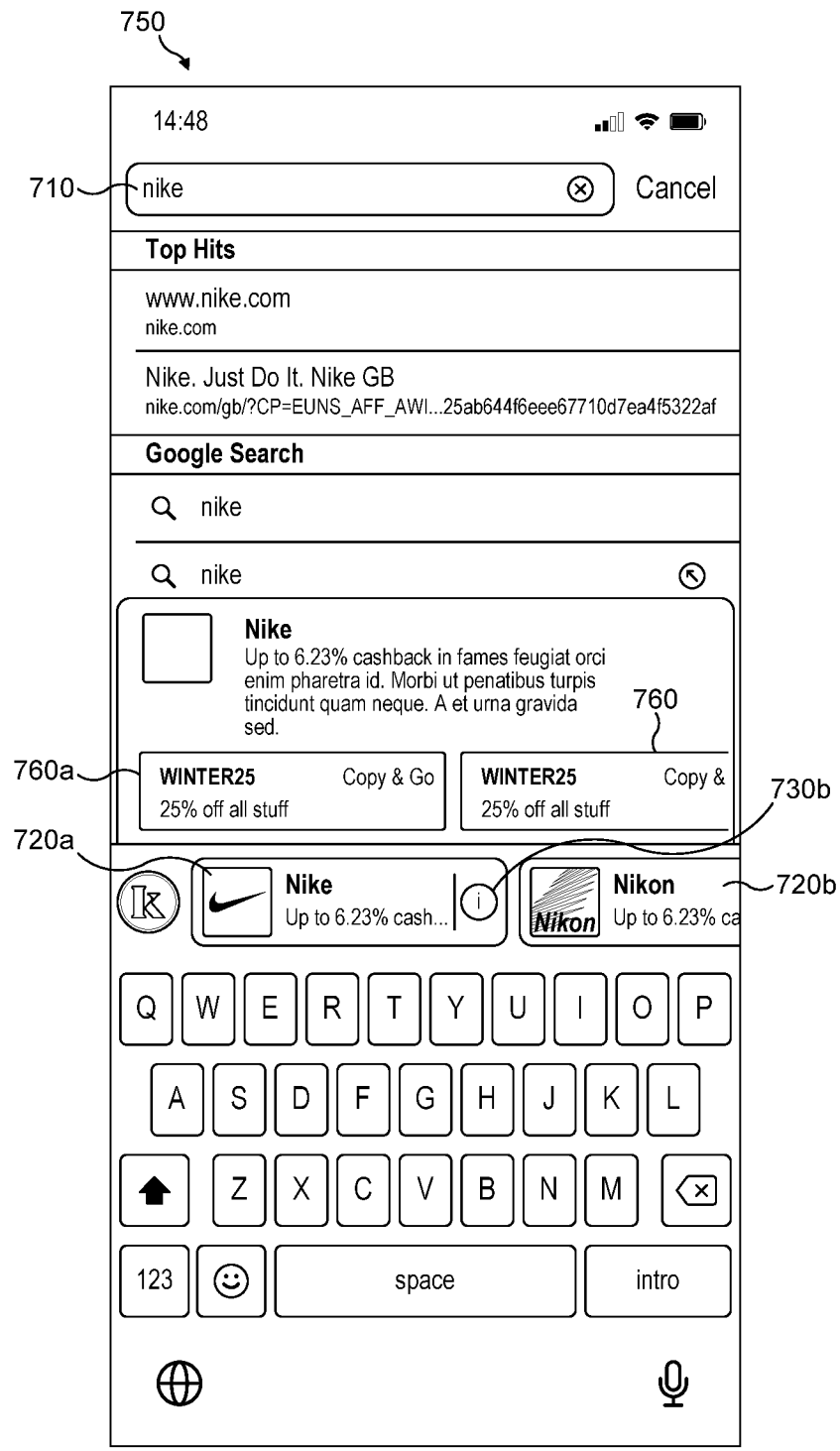
FIG. 7B illustrates a display on a mobile device according to yet a further example.

FIGS. 7A and 7B show example user interfaces 700, 750 of a mobile device in which one or more coupon codes are sourced based on input provided by a user. FIG. 7A shows an example where a user has typed into an address bar 710 of a mobile web browser application, such as the web browser application 250. In particular, the user has typed "nike" and the keyboard interceptor has formed a search query which has located data relating to the brands Nike® and Nikon®. Metadata associated with Nike® and Nikon® is displayed in selectable GUI elements 720a, 720b within the user interface of the keyboard application. In this example, the GUI element associated with Nike® includes an interactive element 730, here shown as an "i".

In FIG. 7B, the user has selected the further interactive element 730. The keyboard interceptor has made a call to request data associated with the brand Nike®, either from local storage on the mobile device, or from the database 160. In response to retrieving the data, the keyboard interceptor 240 has caused the display of further data associated with the brand Nike®. There are at least two coupon codes stored in a record associated with the brand Nike® in the database 160. Data relating to the two coupon codes is displayed above the keyboard within two further selectable GUI elements 760a, 760b. The data displayed includes the coupon code itself, text indicating the discount associated with use of the coupon code and text indicating that the user can select the coupon code, be directed to the Nike® website and that the coupon code will be stored for pasting in a relevant text field on the website. The user may then either: select one of the GUI elements 760a, 760b displaying a coupon code which will cause a unique tracking link to be generated and copy the selected coupon code for later use; or, select the GUI element 720a that displays the brand name which will cause a unique tracking link to be generated without copying a coupon code. If the user selects the GUI element 720a that displays the brand name, the keyboard interceptor 240 may store the coupon codes for later use.

Figure 8A:
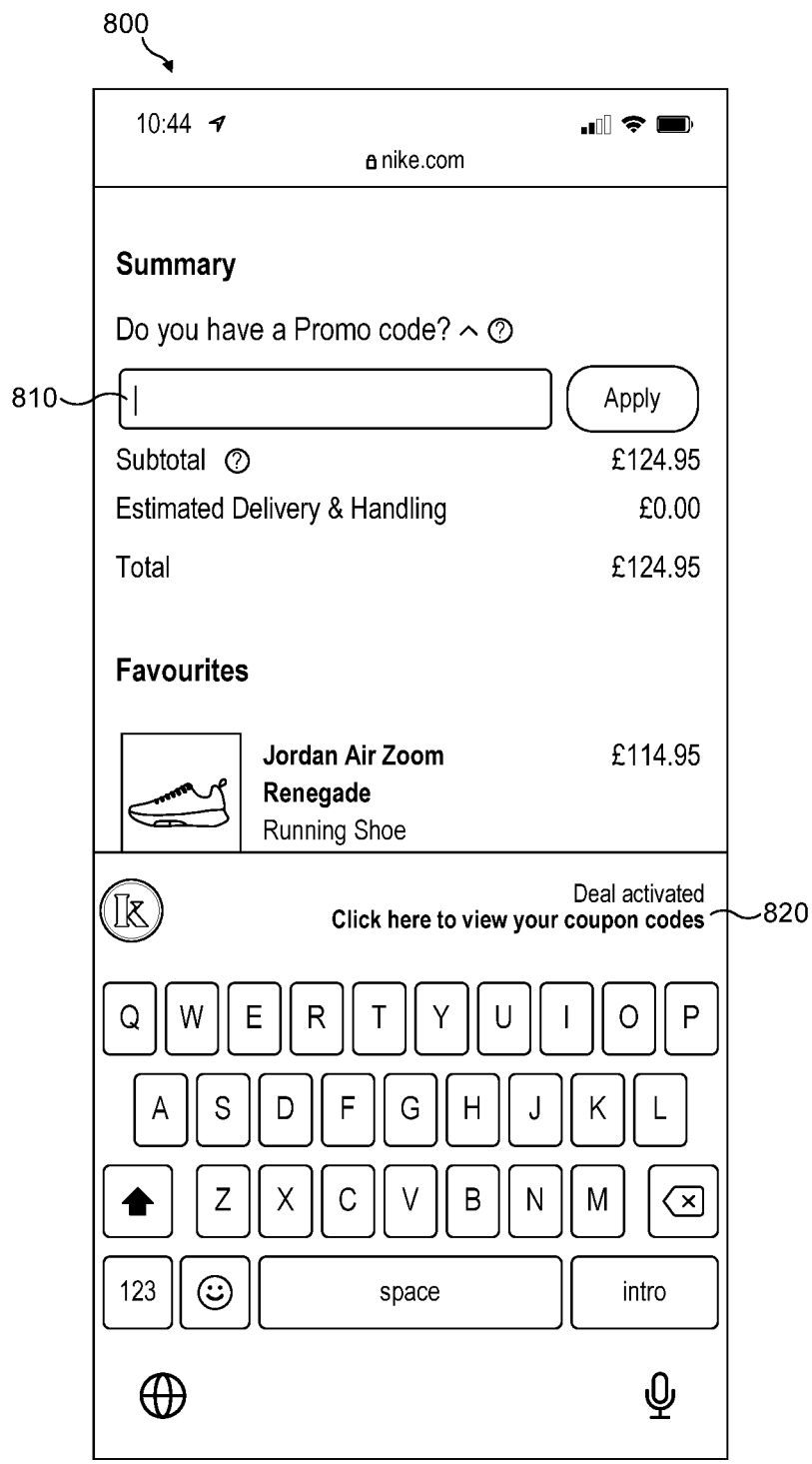
FIG. 8A illustrates a display on a mobile device according to yet a further example.
Figure 8B:
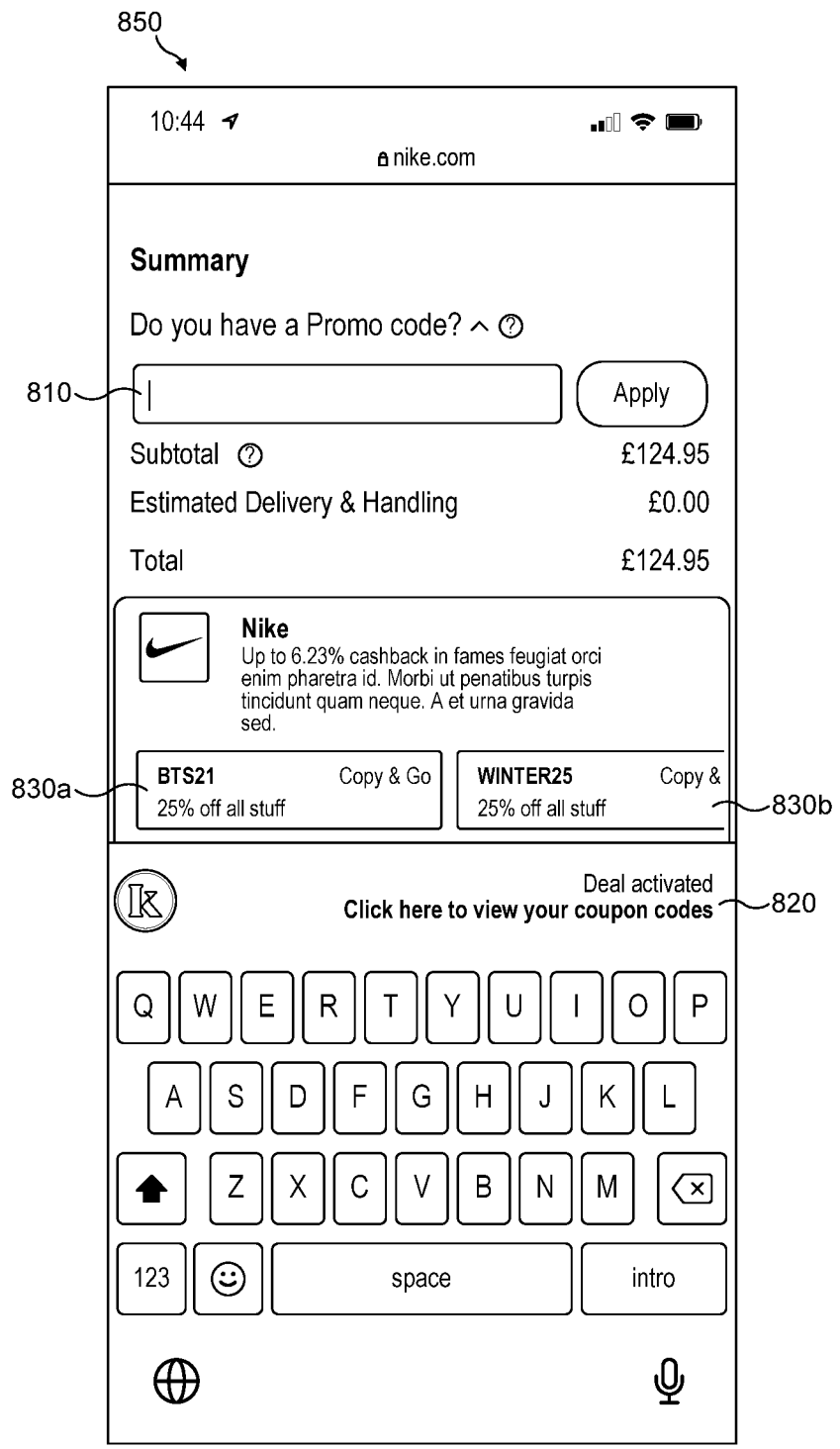
FIG. 8B illustrates a display on a mobile device according to yet a further example.
Figure 9:
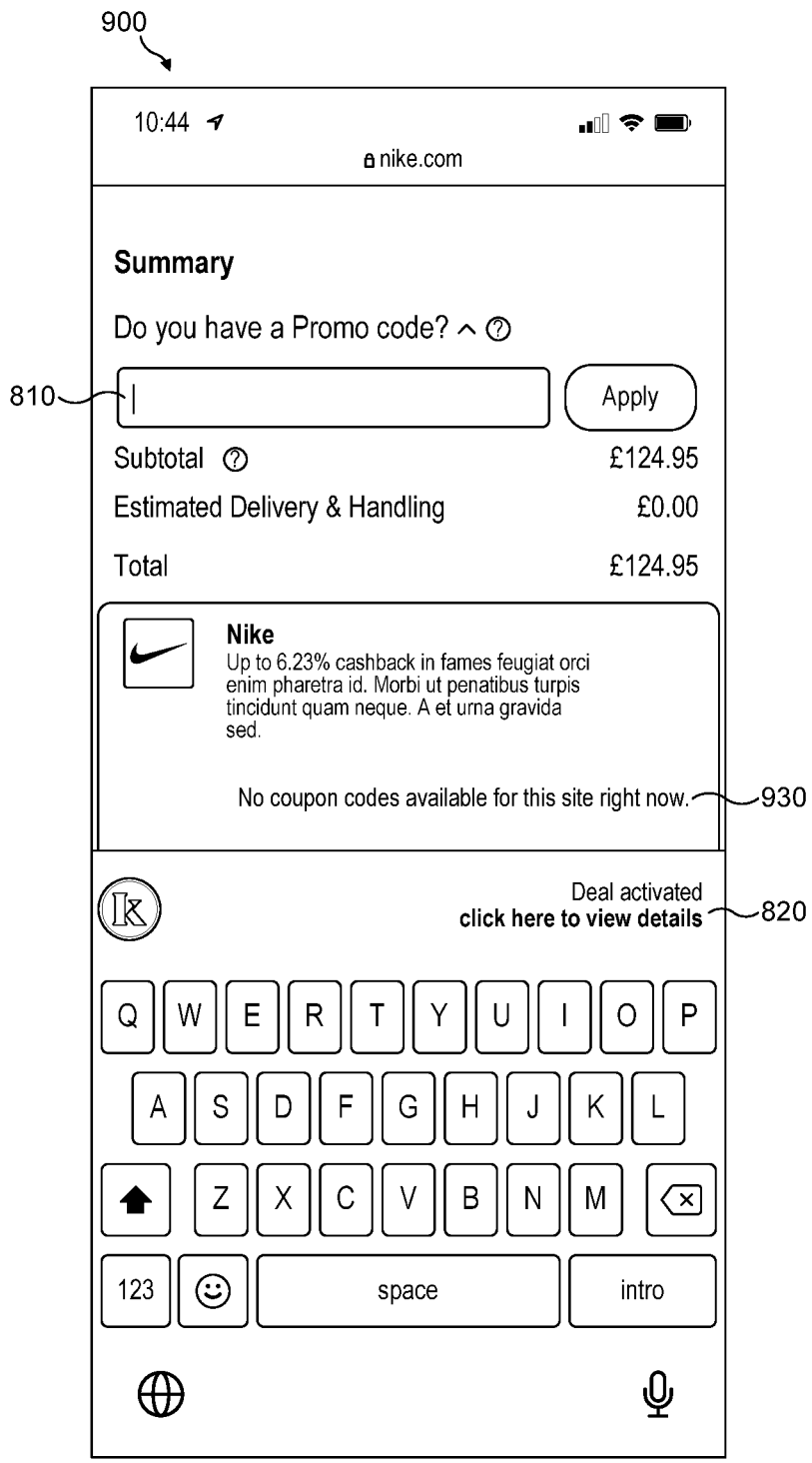
FIG. 9 illustrates a display on a mobile device according to yet a further example.

FIGS. 8A, 8B and 9 show further example user interfaces 800, 850, 900 of a mobile device in which a user wishes to make a purchase via a website. In FIGS. 8A, 8B and 9, the browser has navigated to the current website on the user's mobile device. In FIG. 8A, the user has selected a coupon code text field 810. Data corresponding to coupon codes was previously located based on a search query. In particular, the keyboard interceptor has received an input, be it an input provided by a user into the keyboard application or via current content of the user interface 800 using any of the methods described above (by analysing a screenshot of the user interface or receiving a URL from a web browser extension 255 associated with the web browser application etc.). The keyboard interceptor has then generated a search query which has located one or more coupons for use on the current website. In this example, selection of a coupon code field 810 has been detected by the keyboard interceptor. In response to detecting selection of the coupon code field 810, the keyboard interceptor has caused the display of an indication that one or more coupon codes are available for this brand. This indication is displayed as a selectable GUI element 820 within the user interface of the keyboard application.

FIG. 8B continues the example shown in FIG. 8A, wherein the user has selected the selectable GUI element 820. In response to detecting selection of the selectable GUI element 820, the keyboard interceptor has retrieved the located coupon codes and corresponding metadata relating to said codes, and has caused the user interface to display two further GUI elements 830a, 830b. The two further GUI elements 830a, 830b each display the coupon codes, the deal associated with use of the coupon codes, and a suggestion for the user to select one of these GUI elements 830a, 830b. Selection of one of the further GUI elements 830a, 830b will cause the coupon code associated with whichever GUI element was selected to be inserted into the coupon code field 810.

FIG. 9 shows a further example related to the example shown in FIGS. 8A and 8B, wherein, on selection of the selectable GUI element 820, the keyboard interceptor has not located any coupon codes. Correspondingly, the user interface of the keyboard application is now displaying a notification 930 that no coupon codes have been found.

As discussed above, the keyboard interceptor 240 may be configured to determine whether a selected text field is a text field designated for coupon codes. In one example, the keyboard interceptor 240 is configured to obtain a screenshot of the graphical user interface of the mobile device 200 and perform image analysis to determine whether the text field is a text field designated for coupon codes. In another example, the keyboard interceptor 240 uses an accessibility service 290 on the mobile device to make the determination. In a further example, the keyboard interceptor 240 receives an indication that the text field is designated for coupon codes from a web browser extension 255 associated with the web browser application 250. This will now be discussed further with regards to FIG. 10.

Figure 10:
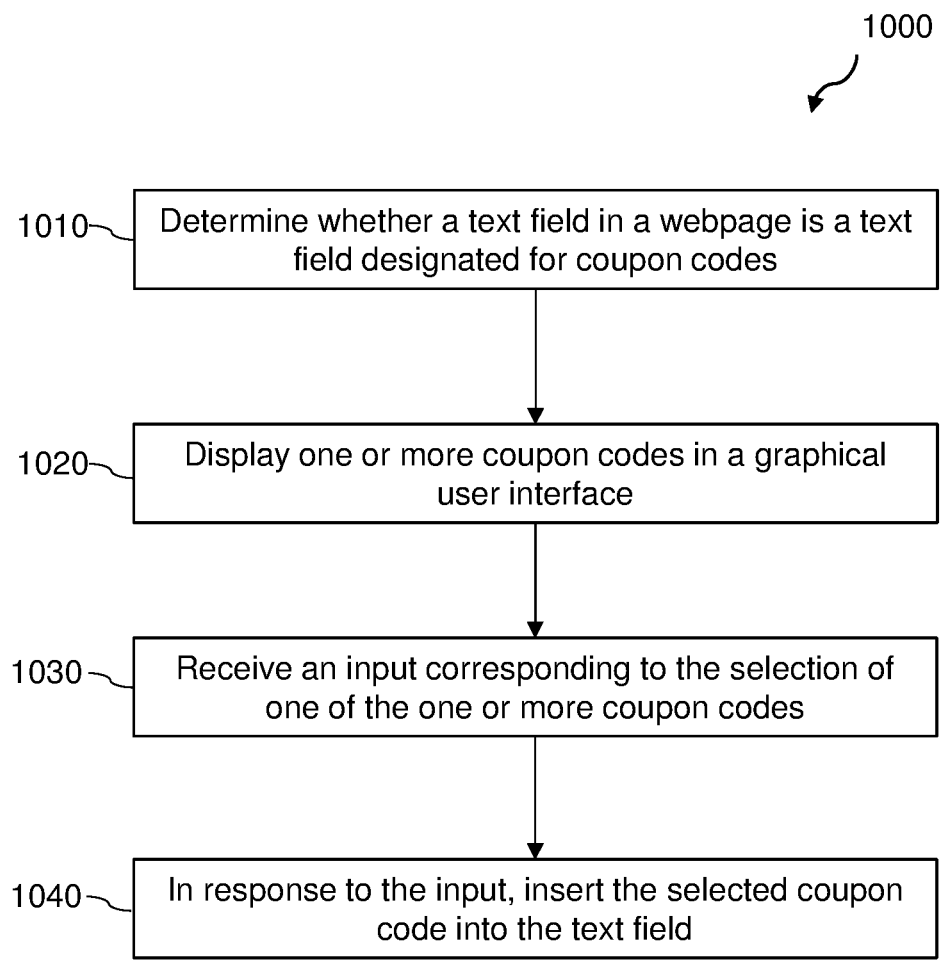
FIG. 10 is a flow chart of a method according to a further example.

FIG. 10 shows an example method 1000 in which a keyboard interceptor is used to insert a coupon code into a coupon code field. In the example method 1000, coupon codes have already been located and are available to the keyboard interceptor 240. The method 1000 may be a continuation of the method 600 shown in FIG. 6. That is, the user has arrived at a website following the generation of a unique tracking link, which has been passed to a web browser application operating on the user's mobile device. In another example, the method 1000 is not a continuation of the method 600, and one or more coupon codes have been located using, for example, the method 1100 shown in FIG. 11. The method 1000 is applicable when the user is accessing any application executing on the mobile device. Examples include web browser applications and merchant specific applications.

In the method 1000, data has been previously located based on a search query, the data associated with a record comprising a record identifier. Further, the data includes one or more coupon codes. However, in the method 1000, the user has not previously selected a specific coupon code to be inserted. Instead, the selection occurs as the user is accessing the application and has selected a text field designated for coupon codes.

At block 1010, the method 1000 involves determining whether a text field in an application executing on a mobile device is a text field designated for coupon codes. In a first example, the keyboard interceptor 240 may receive an indication that a user has selected a text field. The indication may involve determining that the keyboard is active and currently being displayed to a user, or may be based on the detection of an HTML element such as the <textarea> tag, for example. Responsive to a positive determination, the keyboard interceptor 240 obtains a screenshot of the graphical user interface (GUI) of the mobile device. The screenshot may then be analysed to determine that the selected text field is designated for coupon codes. The analysis may involve performing one or more image analysis techniques on the screenshot. For example, the analysis may involve determining that text relating to the use of coupon codes is located within a certain distance to the text field. Terms such as "coupon", "discount", "promo code" and "voucher" located close to a text field may indicate that the text field is a text field designated for coupon codes. Text in the screenshot can be obtained by a text recognition algorithm such as optical character recognition (OCR), and the location of a text field in relation to the text relating to the use of coupon codes may be determined via a shape recognition algorithm, for example. The analysis may be performed by the keyboard interceptor 240. Alternatively, the keyboard interceptor 240 communicates the screenshot to the server 150 so that the server 150 can perform the analysis. In this case, the server 150 sends a further communication to the keyboard interceptor 240 indicating whether a coupon code field is selected.

In a second example, the keyboard interceptor 240 uses an accessibility service 290 on the mobile device to determine whether a text field is designated for coupon codes. The accessibility service 290 may be provided by the operating system of the mobile device and comprise an autofill framework. The autofill framework monitors the designation type of the text field to allow the automatic insertion of data relevant to the text field. In this case, the autofill framework determines that the user has selected a text field designated for coupon codes, and communicates this determination to the keyboard interceptor 240.

In a third example, the keyboard interceptor 240 communicates with the application directly to determine whether the text field is a text field designated for coupon codes. For example, the application may be a merchant's app which defines a coupon code field. An indication that the current text field is designated for coupon codes then may be communicated to the keyboard interceptor 240 via one or more APIs, for example.

In a fourth example, the application is a web browser application 250, and the keyboard interceptor 240 interfaces with a web browser extension 255 associated with the web browser application 250. In this fourth example, as a webpage is being accessed by the web browser application 250, the browser extension 255 may detect an HTML field within the webpage specifically designated to receive text in the form of a coupon code. The browser extension 255 may utilize a function that returns the input fields within the webpage, such as the "getElementsByTagName" function. The input fields may be narrowed down to only those designated for coupon codes via one or more functions, such as the "querySelectorAll" function. If the browser extension 255 determines that a text field has been selected, then the browser extension 255 communicates an indication of this to the keyboard interceptor 240.

At block 1020, the method 1000 involves displaying one or more coupon codes in the GUI of the mobile device. As described above, the keyboard interceptor 240 may have stored the one or more coupon codes when the user first accessed the current website or application, or when a unique tracking link was generated. The coupon codes may be stored locally in cache or in storage 280, for example. In this case, the keyboard interceptor 240 performs a lookup for the one or more coupon codes. Alternatively, the keyboard interceptor 240 may send a request to the server 150 for the one or more coupon codes. The request may be an HTTP request and include the record identifier. Once the one or more coupon codes are retrieved, the keyboard interceptor 240 causes the display of the coupon codes in the GUI of the mobile device, as discussed above.

At block 1030, the method 1000 involves receiving an input corresponding to the selection of the one or more coupon codes. The input signifies the user's intention to insert a coupon code corresponding to the selection.

At block 1040, the method 1000 involves, in response to the input, inserting the coupon code into the text field. As described above, the coupon code may be copied to memory, e.g. a clipboard and then immediately pasted into the text field. Alternatively, the coupon code is directly inserted into the text field by the keyboard interceptor 240 from cache, following the retrieval of the coupon code.

In a related example, the autofill framework can be utilised to insert a coupon code into a text field designated for coupon codes without any input from the user. In this example, the autofill framework determines that the selected text field is designated for coupon codes and communicates this to the keyboard interceptor 240. The keyboard interceptor 240 may then retrieve coupon codes, either from storage or via a request to the server 150. The keyboard interceptor 240 and/or server 160 may automatically determine an appropriate coupon code to be inserted into the text field. The automatic determination may be made based on a discount amount for the purchase item, for example. Once the keyboard interceptor 240 has retrieved the appropriate coupon code, it communicates the code to the autofill framework. The autofill framework is then configured to automatically insert the code into the text field. In this way, as soon as a user selects a coupon code field, a coupon code is automatically sourced and inserted into the field.

A second example involving coupon codes will now be described. In the second example, one or more coupon codes are located independently of the generation of a unique tracking link. In this second example, a search query may be formed by the keyboard interceptor 240 to locate coupon codes.

In a first implementation of the second example, the keyboard interceptor 240 accepts input from a user, for example via the event listener API or via a search bar displayed in the user interface of the keyboard application 220. The search bar may be displayed whenever the keyboard application 220 is displayed, or may be displayed by selecting an option within the user interface of the keyboard application 220. The search bar provides a means by which the user can directly interact with the server 150. For example, the search bar may form a search query based on any input via the search bar. The search bar may accept typed input using the virtual keyboard provided by the keyboard application 220 and/or accept voice input. For example, the search bar may include a selectable icon that activates a microphone of the mobile device 200 and records an audio clip. The keyboard interceptor 240 may use speech to text processing to convert any speech in the audio clip to text, which forms the basis of a search query.

While browsing a website, the user may provide a first input to the search bar of the keyboard interceptor 240. The keyboard interceptor 240 generates a search query based on the first input. The search query is generated in a similar fashion to what has been described with respect to steps S310 and S430 in FIGS. 3 and 4, respectively. In this case, the search query may further include an indication that the first input was provided into the search bar. This indication can be used in association with a set of predefined rules to determine what data is to be located. The predefined rules may be determined by the server 150 and/or by the user via preference settings configured prior to use of the keyboard application 240. The predefined rules may define that only a subset of possible data is to be searched when the user uses the search bar. For example, if the user is currently browsing a website, and wants coupon codes relevant to that website, they may wish to only receive coupon codes when using the search bar. In another example, the subset of data to be located may include at least a URL and an indication of one or more deals available on a website associated with the URL. In this case, the search bar may operate in a similar way to described above when a user is typing into an address bar of a web browser application.

A keyboard application 220 providing a search bar as described above provides a convenient way for a user to access data associated with a brand without requiring a web browser extension (which may not be available on certain mobile devices and/or mobile operating systems) or having to open additional web browser tabs to search for coupon codes, surveys or other data related to the brand.

Data is then located based on the search query and any predefined rule(s) relating to the data to be presented to the user. The data is associated with a record comprising a record identifier. The data may be stored in the database 160 and/or locally, such as in the storage 280. In this example, the data includes one or more coupon codes, and may additionally include further metadata associated with the coupon code(s).

Following the locating of the data, a GUI element associated with the record identifier is displayed to the user within the user interface of the keyboard application 220. The GUI element indicates that a coupon code is available for the merchant associated with the located data. For this reason, the GUI element may include data such as the coupon code itself and metadata associated with use of the coupon code.

The user provides a second input corresponding to the selection of this GUI element. In response to the selection, the keyboard interceptor 240 may store the associated coupon code for insertion into a coupon code field. As has been described above, the coupon code may be copied to a clipboard and/or stored locally for access by the keyboard interceptor 240. In one example, the keyboard interceptor may detect that the user was typing into a coupon code field prior to providing the first input to the search bar (similar to block 1010 described above). In response to the detection and the second input, the keyboard interceptor 240 may directly insert the coupon code into the coupon code field without further input from the user.

In some examples, in addition to storing the coupon code, an identifier associated with the selection of the GUI element may be stored. The identifier may be a randomly generated click ID, as described previously. The identifier may be stored in the database 160 and/or locally, for example in storage 280 on the mobile device 200. The identifier may further be stored in association with one or more of a user identifier, a time and date of coupon code location, and a location of the user at the time that the coupon code was located. Storage of the identifier in association with the generation of the coupon code can be used to track a user's coupon code history. The storage of the identifier may further allow the provider of the keyboard interceptor 240 to earn a reward for providing the coupon code to the user. In other words, locating the coupon code may be a reason why a purchase was made, and so the provider of the keyboard interceptor 240 may be rewarded by the merchant associated with the purchase. In this case, the web browser may store a cookie comprising the identifier associated with the selection of the GUI element. This may allow a merchant to track whether a purchase on the merchant's website followed the location of a coupon code by the keyboard interceptor 240. In one example, the merchant may: verify that a purchase was made, verify that a coupon code was used, and determine the time that the purchase was made. This data, along with the identifier, may be forwarded to the server 150. The server 150 may perform a search for the identifier and verify that the user made the purchase following the location of the coupon code.

In a second implementation of the second example, the keyboard interceptor 240 obtains the URL of a current website as the user is browsing said website in order to generate a search query and locate one or more coupon codes. The keyboard interceptor 240 may obtain the URL of the current web site by taking a screenshot of the user interface of the mobile device 200 as has been described above. The keyboard interceptor 240 may then perform image processing on the screenshot to determine the URL in the address bar of the mobile web browser application 250. In another example of the second implementation of the second example, the keyboard interceptor 240 monitors current content of the user interface obtained via an accessibility service 290 made available to the keyboard interceptor 240 by the operating system of the mobile device 200. The keyboard interceptor 240 may process the current content of the user interface obtained via the accessibility service 290 to determine the URL of the current web site.

In yet another example, the keyboard interceptor 240 may interface with a web browser extension 255 associated with the web browser application 250 to determine the domain name associated with the current website. The browser extension 255 may be the browser extension 255 described above with respect to block 1010 of the method 1000. In this case, the browser extension 255 may be further configured to obtain the URL of the current webpage. The browser extension 255 can then send the URL to the keyboard interceptor 240 either: directly via an API, via shared storage whereby the browser extension 255 stores the URL and the keyboard interceptor 240 accesses the shared storage to retrieve the URL, or indirectly through the server 150.

Based on the determined URL, the keyboard interceptor 240 generates a search query. Generating the search query may involve identifying the domain name, one or more of keywords, brand names, and brand slogans from within the URL. The search query is then generated in a similar fashion to what has been described with respect to steps S310 and S430 in FIGS. 3 and 4, respectively, but in this case, the search query may be based on a URL that has been derived automatically by the keyboard interceptor 240. Further, the search query may include an indication that the search terms were obtained from monitoring the user interface. The indication may be used by the server 150 to determine what data to locate and send to the keyboard interceptor 240. As described above, a set of predefined rules may be used to determine what data to locate. For example, a user may only want to see coupon codes relevant to the website they are browsing. The predefined set of rules be determined by the server 150 and/or by the user, via preference settings configured prior to use of the keyboard application 220.

Based on the search query, and optionally predefined rules relating to the data to be presented to the user, data is located, wherein the data is associated with a record comprising a record identifier. In this case, the located data comprises one or more coupon codes. This locating may be done in accordance with the steps S320 and S440 in FIGS. 3 and 4, respectively. That is, local storage 280 and/or the database 160 are queried for data relating to the search query.

Once data is located, a GUI element is associated with the record identifier, within a user interface of the keyboard application. The GUI element may indicate that one or more coupon codes are available to the user, or alternatively display any available codes. If the GUI element indicates that one or more coupon codes are available, the user may select the GUI element to be presented with the available codes. Each available code may be displayed as a separate further GUI element.

The user may then select the GUI element corresponding to a particular coupon code via a first input. In response to the first input, the keyboard interceptor 240 may store the coupon code. The coupon code may be stored by copying the code to a clipboard and/or stored locally so that it is accessible to the keyboard interceptor 240 for later insertion into a relevant text field. In some examples, the keyboard interceptor 240 may further detect that the user is typing into a coupon code field, and in response, immediately insert the coupon code into the coupon code field.

In addition to storing/inserting the coupon code, an identifier associated with the selection of the GUI element may be stored as has been described above. The identifier may be a randomly generated click ID. The web browser application 250 may store a cookie comprising the identifier associated with the selection of the GUI element. This allows a merchant to track whether a purchase on the merchant's website followed the location of a coupon code by the keyboard interceptor 240. The merchant may further forward an indication of a purchase to the entity associated with the server 150 along with the identifier associated with the selection of the GUI element. The entity associated with the server 150 may then associate the purchase to the user, and claim a reward from the merchant in exchange for providing the coupon to the user.

In some examples, the keyboard interceptor 240 may cause a new tab to be opened within the web browser application 250. The cookie may then be stored, by the web browser application 250, in the new tab. Once the cookie has been stored, the keyboard interceptor 240 may cause the new tab to close. This process allows the cookie to be stored without reloading the current webpage being viewed by the user.

In further examples, other data relating to the brand associated with the record identifier may be displayed to the user in response to the location of data in addition, or alternatively, to the one or more coupon codes. The data may include one or media items stored in the database and associated with the same record as the located data. In some examples, the keyboard interceptor 240 may receive one or more media items associated with the brand. The media may be displayed to the user in addition to the GUI element indicating that a deal has been located corresponding to the merchant. This further incentivises the user to visit the merchant's web site.

Surveys

As described briefly above, the keyboard interceptor 240 may be configured to receive and/or otherwise identify content such as one or more of text, images, video and audio, and communicate the received content to a third party.

In one example, the keyboard interceptor 240 allows for a user to set up an account associated with a third party such as the provider of the keyboard interceptor 240. The account may allow a user to view and track their rewards awarded through use of the keyboard interceptor 240. The account could also be used by the user to withdraw their rewards. Withdrawing a reward may involve connecting to a payment service in order to deposit funds and/or add credits to one or more apps also on the mobile device 200.

In another example, the keyboard interceptor 240 allows for the completion of surveys within the user interface of the keyboard application 220. A survey is understood to include one or more questions that can be used to gauge a user's opinion on a particular matter. The questions may require input of any of text, images, video, and audio from the user.

Questions relating to a survey may be stored in the database 160, within the record associated with a brand and comprising a record identifier. The method 600 may be applied to allow a user to complete a survey that is relevant to the brand, using the keyboard interceptor 240. In particular, the data located at block 630 may include one or more surveys, wherein each survey comprises one or more survey questions, and possibly includes metadata relating to the survey(s), such as a discount amount for completion of the survey, and titles of the one or more surveys. Each survey may also have an associated survey identifier because multiple surveys may exist within the same record in the database 160. The survey identifier can be used to identify a survey amongst other surveys in the same record.

At block 640, the GUI element in the user interface of the keyboard application associated with the record identifier may include an indication that one or more surveys are available for this brand. Metadata relating to the one or more surveys, located based on the search query, may also be displayed in association with the GUI element. This might indicate that the user may receive a reward for completion of the survey(s).

As described above, the GUI element may comprise a further interactive element. User selection of the further interactive element may cause one or more further GUI elements to be displayed above the GUI element. The further GUI elements may each indicate that a survey is available for completion by the user. The further GUI elements may also display metadata relating to the respective surveys. In this case, the further GUI elements may display a title of the survey as well as the reward available for completion of the survey.

At block 650, the keyboard interceptor 240 sends a request for data relating to the questions of the survey. The request may be sent as part of the requests M350 or M470 in FIGS. 3 and 4, respectively. The data relating to the questions in the survey is then sent back to the keyboard interceptor 240 for displaying to a user, along with the unique tracking link. The data may be sent back to the keyboard as part of the messages M370 or M490.

In one example, once the website associated with the unique tracking link is accessed via the web browser application 250, the keyboard interceptor 240 causes questions in a survey associated with the GUI element to be displayed within the user interface of the keyboard application 220. In this way the user can complete the survey independently of making any purchases on the website. In another example, the keyboard interceptor 240 causes the display of the survey after a user has completed a purchase on the website. In yet another example, the keyboard interceptor 240 causes the display of the survey when it is determined that the user has navigated away from the website. The decision of when to display the survey to the user may be based on the content of the survey and determined according to rules set by a third party such as the provider of the keyboard interceptor 240 and/or the merchant. For example, a survey may relate to a user's experience of browsing the merchant's website. In this case, the survey may be displayed following a determination that the user has navigated away from the website.

The questions of the survey may be displayed in the region of the user interface of the mobile device 200 directly above the user interface of the keyboard application 220. Alternatively, the survey may be displayed in the user interface of the keyboard application 220 so that it overlays at least one portion of the keyboard. In a further example, the survey is displayed so that it substantially fills the graphical user interface of the mobile device 260.

A user may complete the survey by directly answering the survey questions using the keyboard interceptor 240. The user may give answers in any format, such as text, images, video and audio. For example, a survey may request a user takes a photograph of a recent purchase for proof of purchase etc. The user may then input a photograph of their purchase into the survey. The photograph may be selected from a Gallery app on the mobile device 200. Alternatively, the keyboard interceptor 240 may activate a camera app operating on the mobile device 200 to allow the user to take the photograph. Once the user has taken the photograph, it is input by the keyboard interceptor 240 as an answer to the question in the survey.

A new entry may be created in the database 160 following the user's completion of the survey. The new entry may comprise at least one of the identifier associated with the selection of the GUI, the user's answers to the survey questions, a survey identifier, a user identifier, and the record identifier. Data in the new database entry can be communicated to the merchant associated with the survey so that the merchant can provide a reward to an entity associated with the database 160. The merchant may send back to the entity associated with the database 160 a list of rewards for completion of surveys by respective users. The list may further include the identifiers associated with the selection of the user's respective GUI elements. The entity associated with the database 160 can then credit the user with a proportion of the reward. The user can be identified by querying the database for the identifier associated with the selection of the GUI and the user identifier. This process ensures that none of the user's personal information is communicated between the merchant and the server 150, while still allowing the tracking of user activity.

In a related example, if at block 630, data relating to one or more surveys is located, the GUI element associated with the record identifier may indicate that one or more surveys are available. Selection of the GUI element, in this example, causes a unique tracking link to be generated, but does not cause the keyboard interceptor 240 to request data relating to a survey. Instead, as the user is browsing the website associated with the unique tracking link, the keyboard interceptor 240 may cause an indication that one or more surveys are available for the website to be displayed within the user interface of the keyboard application 220. The indication may include one or more selectable GUI elements. Upon selection of a selectable GUI element, the keyboard interceptor 240 may send a request for data relating to the located one or more surveys, or may retrieve data relating to the one or more surveys that was stored previously. In response to the selection of the selectable GUI element, the keyboard interceptor 240 may cause one or more further GUI elements to be displayed in the user interface of the keyboard application 220. Each of the further GUI elements is associated with a survey and may display metadata relating to the survey. Selection of one of the further GUI elements causes questions relating to the selected survey to be displayed. In this case, the user may decide to complete a survey only after they have arrived at the website.

A second example involving surveys will now be described. In the second example, one or more surveys can be located independently of the generation of a unique tracking link. This example is similar to the second coupon code example described above.

In a first implementation of the second example, the keyboard interceptor 240 may receive an input by the user via the event listener API or via a search bar provided in the user interface of the keyboard application 220. As has been described above, the keyboard interceptor 240 can generate search queries based on any input to the search bar. In this case, data located based on the search query may include one or more surveys. A GUI element may be associated with the location of the data, and may include further interactive elements. The further interactive elements may be selected to cause the display of one or more further GUI elements. Each of the one or more further GUI elements may be displayed in a region above the GUI element and correspond to a survey that is available for the user. Selection of a (further) GUI element associated with a survey may cause the corresponding survey to be displayed within a region of the graphical user interface of the mobile device 260. In particular, a selection of the (further) GUI element causes the keyboard interceptor 240 to send a request (similar to M350 and M480) for data relating to the questions of the survey. The data may be communicated back to the keyboard interceptor via a message from the database 160 or local storage 280 (similar to M370 and M490). The survey may then be displayed as soon as the data relating to the survey is retrieved. This is because the user need not necessarily be browsing a web site associated with the survey.

In some examples, the search bar provided by the keyboard interceptor 240 may be used to locate one or more of a URL for a website, coupon code(s), survey(s), and media. The keyboard interceptor 240 may therefore display each item in the user interface of the keyboard application 220 as a separate GUI element. Therefore, it is possible that, for example, both coupon codes and surveys are found corresponding to a single merchant. In this case, a plurality of GUI elements may be displayed, each corresponding to any of: a URL for the website, wherein at least one deal is available if the user makes a purchase on the website, a coupon code, and a survey. Thus, the plurality of GUI elements may be displayable to the user showing all of the different offers available from a particular merchant.

In a second implementation of the second example, the keyboard interceptor 240 may monitor the content of the GUI of the mobile device 200 to obtain a URL of a current website that the user is browsing. This may involve the keyboard interceptor 240 obtaining a screenshot of the GUI and performing image analysis to determine the URL. In another example, the keyboard interceptor 240 may analyze the current content of the GUI obtained via an accessibility service 290 to determine the URL of the current web site.

In another example, the URL of the current website may be detected by a browser extension 255 associated with the web browser application 250, as has been described above. The browser extension 255 may then communicate the detected URL to the keyboard application 240.

As described above, the obtained URL can be used to generate a search query. Data is located based on the search query, the data associated with a record comprising a record identifier. In this example, the data comprises a survey comprising one or more survey questions. A GUI element in the user interface of the keyboard application 220 is associated with the record identifier. The GUI element may indicate that one or more surveys have been located based on the search query. As described above, the GUI element may comprise a further interactive element, which, when selected, causes one or more further GUI elements to be displayed. Each further GUI element is associated with a located survey. In response to a user's selection of a GUI element associated with a located survey, the keyboard interceptor 240 retrieves questions in the survey and causes the questions to be displayed within the graphical user interface of the mobile device 260.

On completion of the survey, a new entry in the database 160 is created. The new entry comprises the identifier associated with the selection of the GUI, the user's answers to the survey questions, a survey identifier, and a user identifier. Data stored in this new entry can be used by an entity associated with the database 160 to obtain a reward from the merchant.

Figure 11:
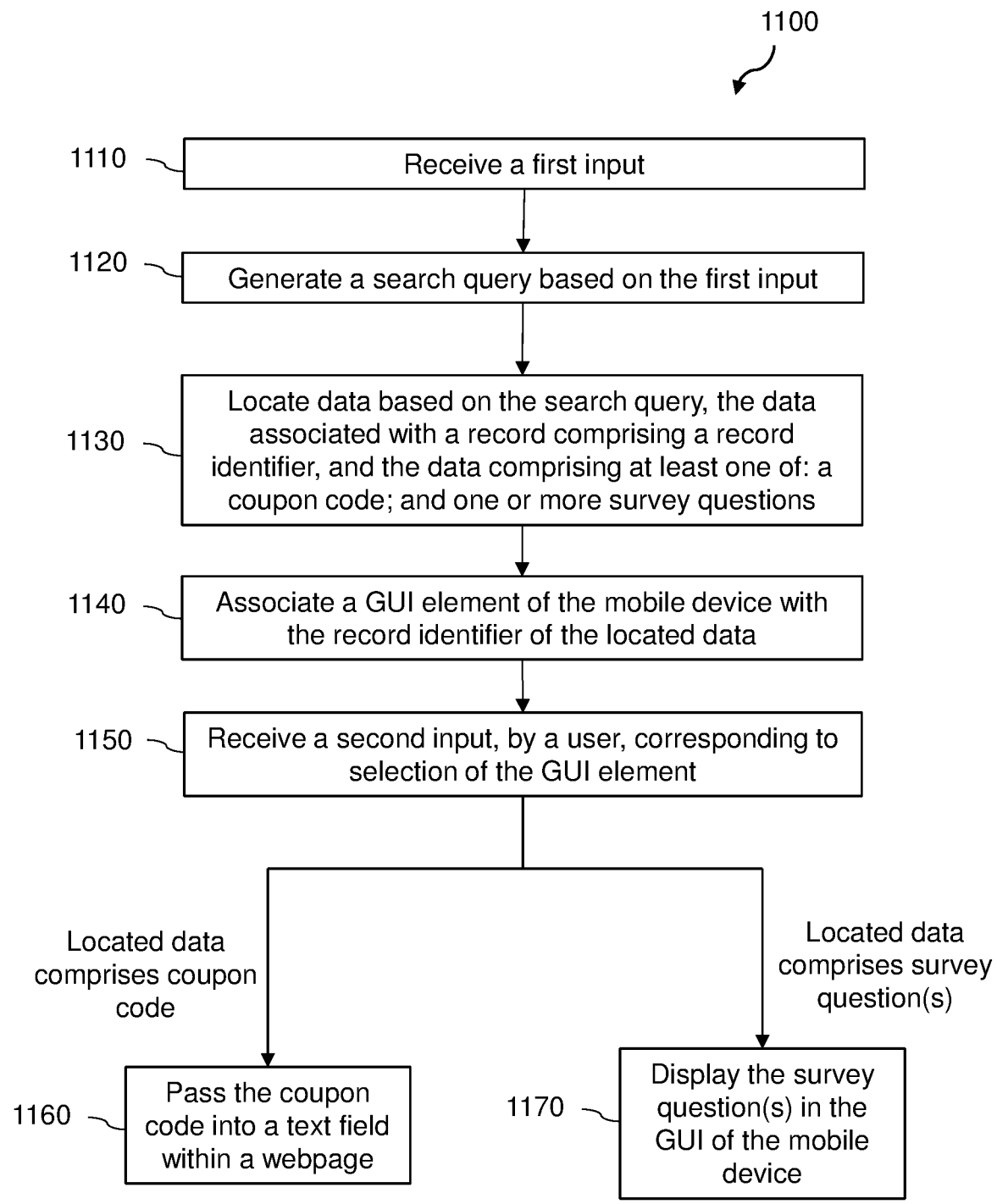
FIG. 11 is a flow chart of a method according to yet a further example.

FIG. 11 sets out, in broad terms, steps performed by a mobile device, such as the mobile device 200 according to the embodiments described above. At block 1110, the method 1100 involves receiving, by a keyboard application 220 executing on the mobile device 200 a first input. The first input may be obtained from a user providing the first input. The user may be providing input to a field within an application executing on the mobile device or e.g. into a search bar displayed by the keyboard application 220. The search bar may be displayed whenever the keyboard is active or displayed by selecting an option within the user interface of the keyboard.

In another example, the first input may be an indication of the current application executing on the device. The indication may include an application identifier that uniquely identifies the application.

In another example, if the current application is a web browser application 250, the first input may comprise a URL of a webpage currently being viewed by the user, or a domain name associated with the URL. For instance, the keyboard application 220 may receive data indicative of current content displayed within the GUI of the mobile device 200, and determine a URL and/or a domain name by analyzing the data indicative of the current content. The URL may be obtained by any of the methods described above, for example, by obtaining a screenshot of the current GUI of the mobile device and performing image analysis on the screenshot, through the use of an accessibility service 290 executing on the mobile device, or via a web browser extension 255 associated with a web browser application being used to display the current webpage.

At block 1120, the method 1100 involves generating, by the keyboard application 220, a search query based on the first input. The search query may be formed similarly to what has been described above. In the case that the first input is a voice input, the search query may be generated by first converting the voice input to text using speech to text processing.

At block 1130, the method 1100 involves locating data based on the search query, wherein the data is associated with a record, the record comprising a record identifier. The data comprises at least one of: a coupon code and one or more survey questions associated with the record.

At block 1140, the method 1100 involves associating, within a user interface of the keyboard application 220, an element of a graphical user interface, GUI, of the mobile device, with the record identifier. The GUI element may display one or more pieces of metadata associated with the located data. In the case that the data comprises one or more coupon codes, the GUI element may display information relating to a specific coupon code. This could be the coupon code itself and/or a discount associated with use of the coupon code. In the case that the data comprises a survey, the GUI element may display information associated with the survey such as a title of the survey and/or a reward provided for completing said survey.

At block 1150, the method 1100 involves receiving a second input, by the user, corresponding to selection of the GUI element. Responsive to receiving the second input, the keyboard application performs an action associated with the located data. If the located data comprises a coupon code, then the method 1100 may proceed to block 1160, whereby the action involves passing, the coupon code into a text field within an application executing on the mobile device. As described above, the coupon code may be stored in memory and made accessible for insertion by the keyboard application 220 e.g. via the clipboard when the user selects the text field. The coupon code may be passed into the text field by the keyboard application 220 or a web browser extension 255.

If the located data comprises one or more survey questions, then the method 1100 may proceed to block 1170, whereby the action involves displaying, by the keyboard application 220, the one or more coupon codes in the GUI of the mobile device 200.

It is understood that both coupon codes and one or more survey questions could be located at block 1130. In this case, there may be more than one GUI element associated with the record identifier of the located data, each of the GUI elements corresponding to a respective coupon code and survey.

In some cases, responsive to receiving the second input, the keyboard application 220 may generate, without user input, a unique tracking link comprising a URL and a randomly generated identifier, the URL being for a website associated with the located data. The keyboard application 220 may then pass the unique tracking link to an address bar of a web browser application 250, for example. In another example, the keyboard application 220 may cause any application currently being accessed to display the website associated with the URL via a system service such as Android Web View or Web Views on iOS. The coupon code and/or one or more survey questions may then be made available to the user once the user has been navigated to the website.

When the located data comprises a coupon code, the method 1100 may further comprise determining, by the keyboard application 220, that the text field is a text field designated for coupon codes. Determining that the text field is designated for coupon codes may be performed as described above, and may include analyzing, by the keyboard application 220, a screenshot of the GUI of the mobile device, or receiving, by the keyboard application, the designation from an autofill service or web browser extension 255.

The method 1100 may further involve, generating, by the keyboard application 220 and without user input, a randomly generated identifier associated with the selection of the GUI element. The randomly generated identifier may be stored in a database 160 in association with the record identifier and a user identifier. Then, the web browser application 250 may store a cookie comprising the randomly generated identifier associated with the selection of the GUI element. In some examples, the keyboard application 220 (or web browser extension 255, when present) may cause a new tab to be opened within the web browser application, so that the cookie is stored when the new tab is opened. The keyboard application 220 (or web browser extension 255) may then cause the new tab to be closed when the cookie has been stored.

When one or more survey questions are displayed, the method 1100 may then further comprise receiving one or more further inputs by the user corresponding to completion of the survey. In response to receiving the one or more further inputs, the method may further involve storing, in a database, the randomly generated identifier, a user identifier, and data indicative of the one or more further inputs. The stored randomly generated identifier, user identifier, and data indicative of the one or more further inputs may allow a merchant to determine that the user has completed the survey. A further GUI element may be displayed on indicating completion of the survey. A reward may then be issued by the merchant in response to determining that the user has completed the survey. The reward may be issued to an entity associated with the keyboard application 220. The entity associated with the keyboard application 220 may then award a portion of the reward to the user.

Figure 12:
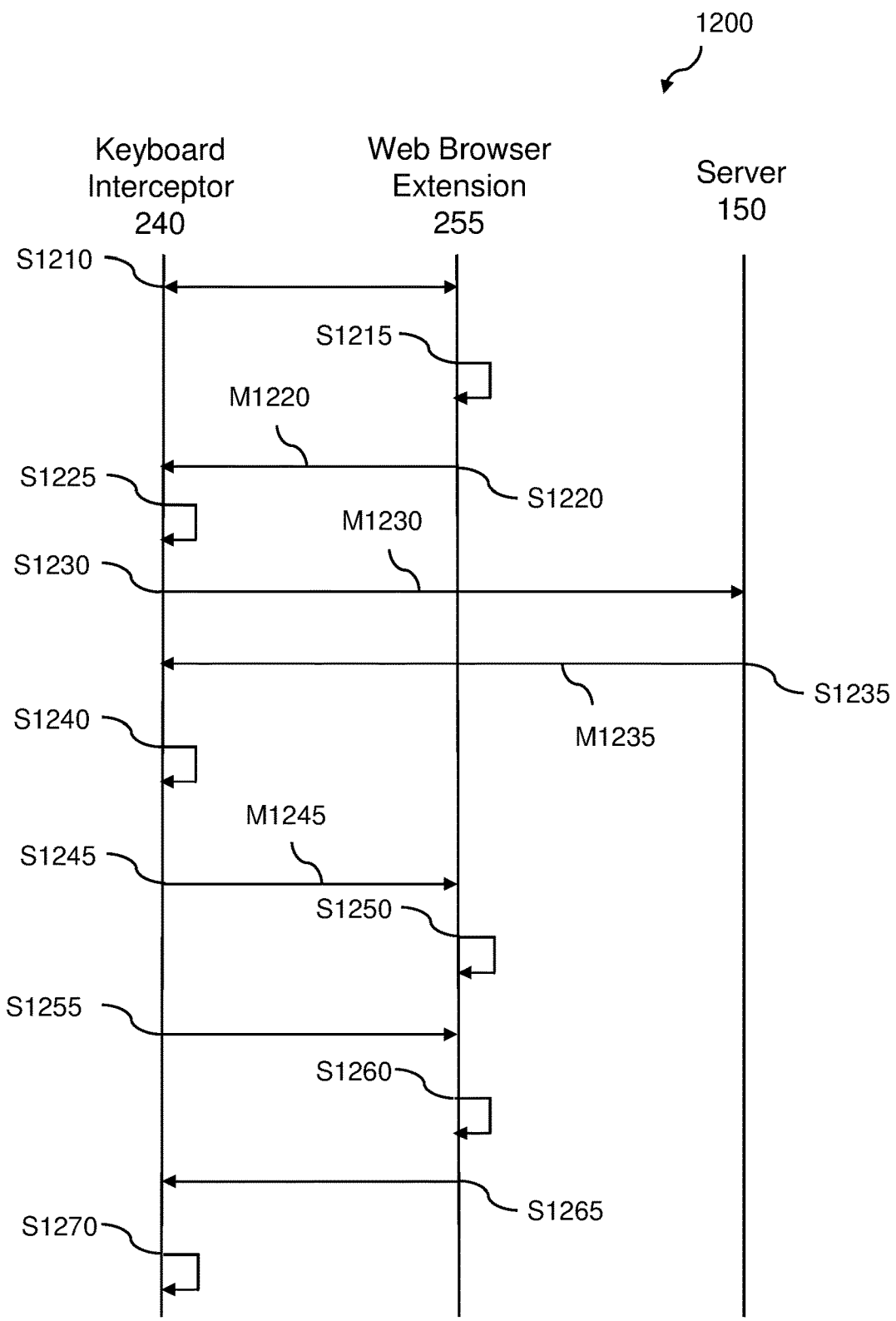
FIG. 12 shows a flow diagram illustrating a process flow according to a further example.

FIG. 12 shows a process flow diagram illustrating the communication flow 1200 between the keyboard interceptor 240, a web browser extension 255 and the server 150 wherein a unique tracking link is generated and a coupon code is inserted into a text field designated for coupon codes. At step S1210, the keyboard interceptor 240 and the web browser extension 255 perform a registration procedure. This procedure allows the web browser extension 255 to communicate with the keyboard interceptor 240.

At step S1215, the web browser extension 255 detects a URL of a current webpage being accessed by a web browser application 250.

At step S1220, the URL is transmitted, via message M1220, from the web browser extension 255 to the keyboard interceptor 240. The type of message M1220 depends on the communication means between the keyboard interceptor 240 and the web browser extension 255. As described above, communication may be via an API on the mobile device 200, communication may be via shared storage on the mobile device 200, or communication may be via the server 150 (not shown).

At step S1225, the keyboard interceptor 240 generates a search query based on the received URL. The keyboard interceptor 240 may extract one or more of a domain name, keywords, and a ccTLD from the URL to generate the search query.

At step S1230, the keyboard interceptor 240 transmits the search query to the server 150 via a further message M1230. The server 150 may query a database for relevant data associated with the search query, as has been discussed above.

At step S1235, located data is transmitted from the server 150, to the keyboard interceptor 240 via a further message M1235.

At step S1240, the keyboard interceptor 240 receives a selection of an element displayed in the GUI of the mobile device and associated with the located data, as has been discussed above. In response to the selection of the GUI element, the keyboard interceptor 240 generates a unique tracking link.

At step S1245, and responsive to the selection of the GUI element, the keyboard interceptor 240 transmits the unique tracking link to the web browser extension 255 via a further message M1245.

At step S1250, the web browser extension 255 passes the unique tracking link to the web browser application 250. The web browser extension 255 may do this by opening a new tab within the web browser application 250, passing the unique tracking link to the new tab, and closing the new tab when a cookie has been stored by the web browser application 250.

At step S1255, the keyboard interceptor 240 detects that a user has selected a field within a webpage, and transmits an indication of the selection to the web browser extension 255 via a further message M1255.

At step S1260, the web browser extension 255 detects that the selected text field is a text field designated for coupon codes.

At step S1265, the web browser extension 255 transmits an indication that the selected field is a text field designated for coupon codes via a further message S1265.

At step S1270, the keyboard interceptor 240 inserts the coupon code into the text field designated for coupon codes.

It is understood that not all of the steps S1210-S1270 need to be performed in an example implementation. For example, only steps S1210-S1250 may be performed when no coupon code is found in the located data or where the user wishes not to take advantage of a coupon code, for example. Similarly, only steps S1255-S1270 may be performed when the user wishes not to take advantage of a cashback incentive or where the user has opted to prevent cookies from being stored on their web browser application 250, for example.

In further examples, one or more steps performed by the keyboard interceptor 240 may be performed by the web browser extension 255. An example is the generation of the unique tracking link at step S1240. Instead of being generated by the keyboard interceptor 240, in response to the selection of the GUI element, the keyboard interceptor 240 may cause the web browser extension 255 to generate the unique tracking link. A further example is the insertion of the coupon code into the field designated for coupon codes at step S1270. In this case, responsive to the detection that the selected text field is a text field designated for coupon codes at step S1260, the web browser extension 255 may insert the coupon code to the text field.

In further examples, the flow 1200 may alternatively proceed without the use of the keyboard interceptor 240 at all. For example, the web browser extension 255 may perform steps S1225, S1230, S1235 and S1240 to generate the search query based on the detected URL, transmit the search query to the server 150, receive the located data from the server 150 and generate the unique tracking link in response to a selection of a GUI element, respectively. In this case the web browser extension 255 associated with the web browser application 250 more closely imitates a desktop web browser extension.

Displaying Media

In a further example, the keyboard interceptor 240 may be provided by a keyboard application 220 associated with an entity, along with a keyboard SDK 230. For example, the keyboard application 220 may be an entity's official app. In this case, the keyboard interceptor 240 provides the possibility of further interaction by displaying data to the user on an ad-hoc basis. In particular, the database 160 may comprise data associated with an entity providing the keyboard application 220, and this data may be communicated to the keyboard interceptor 240. For example, whenever the keyboard application 220 is active and displaying a keyboard in the graphical user interface of the mobile device 200, the entity may use the keyboard interceptor 240 to display one or more media items above the keyboard. In this case, the keyboard interceptor 240 may send a request to the server 150 for data in a record associated with the entity. What data is communicated back to the keyboard interceptor 240 may depend on a set of rules defined by the entity. In one example, the data may relate to a particular advertisement campaign associated with the entity. The data may include media such as any of text, images, video, and/or audio which may entice the user to visit a website associated with the entity. In one case, a selection of any of the media items will generate a unique tracking link, according to any of the methods described above. In another example, the brand may use the keyboard interceptor 240 to display metadata associated with one or more surveys without requiring input from the user. The metadata associated with the surveys, and the survey questions themselves, can be retrieved from the database. This allows the entity to reach out to the user whenever the keyboard is active.

In some examples, the keyboard SDK 230 is configured to pass media and/or content accessed by the user when using the keyboard application 220 associated with the entity to the keyboard interceptor 240. In this way, the keyboard interceptor 240 does not need to communicate with the server 150 to retrieve and display data. Instead, data stored in association with the keyboard application 220 may be communicated to the keyboard interceptor 240 for display to a user. For instance, whenever the keyboard is active, the keyboard application 220 may be running in the background and communicating data to the keyboard interceptor 240. In one example, the keyboard application 220 communicates with a server associated with the entity to obtain the media and/or content. In another example, the keyboard application 220 locates the media and/or content stored locally on the mobile device 200. The keyboard SDK 230 may also provide tracking functionality that enables a determination of what media has been accessed by the user. This can be used to determine what to display to the user next.

As has been described, the keyboard interceptor 240 may be configured to receive input from a user in the form of text, images, video and audio. In a further example, the keyboard interceptor 240 may be provided alongside the keyboard SDK 230 as part of a merchant's app. In this case, when the user has made a purchase from the merchant that is not related to use of the keyboard interceptor 240, for example, if the user has made a purchase at a physical store, then the keyboard interceptor 240 may allow a user to input an image of their physical receipt. This may allow the user to upload a proof of purchase from outside the merchant's app.

In other examples, the keyboard interceptor 240 may be configured to accept images of codes, such as Quick Response (QR) codes. If a QR code encodes a URL corresponding to a website, the keyboard interceptor 240 may analyse the URL to determine whether a matching URL appears in the database 160. If a positive match is found, the keyboard interceptor 240 may cause the user to be directed to the website via a unique tracking link, generated as described above, instead of via the URL that was encoded in the QR code.

The above embodiments are to be understood as illustrative examples. Further embodiments are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method comprising:
   detecting, by a web browser extension associated with a web browser application executing on the mobile device, a Uniform Resource Locator for a website;
   receiving, by a keyboard application executing on the mobile device, and from the web browser extension, the Uniform Resource Locator;
   generating, by the keyboard application, a search query based on a domain name associated with the Uniform Resource Locator;
   locating data based on the search query, wherein the data is associated with a record, the record comprising a record identifier;
   associating, by the keyboard application, an element of a graphical user interface, Graphical User Interface, of the keyboard application, with the record identifier;
   receiving, by the keyboard application, an input entered by the user, corresponding to selection of the element of the Graphical User Interface;
   responsive to receiving the input:
      generating, by the keyboard application and without user input, a unique tracking link comprising a Uniform Resource Locator and a randomly generated identifier associated with the selection of the Graphical User Interface element, the Uniform Resource Locator being for the website and which is associated with the located data; and
      passing the unique tracking link to the web browser application executing on the mobile device to access the website;
   storing, in a database, the unique tracking link in association with the record identifier and a user identifier; and
   storing, by the web browser application while accessing the website, a cookie comprising the randomly generated identifier associated with the selection of the Graphical User Interface element.

2. The method according to claim 1, further comprising:
   responsive to receiving the input, receiving by the web browser extension, and from the keyboard application, the unique tracking link;
   opening, by the web browser extension, a new tab within the web browser application;
   passing, by the web browser extension, the unique tracking link to the new tab whereby to access the website in the new tab; and
   closing, by the web browser extension, the new tab when the cookie has been stored.

3. The method according to claim 1, wherein the located data comprises one or more coupon codes, the method further comprising:
   detecting, by the keyboard application, a selection of a text field within a webpage of the website;
   receiving, by the web browser extension, and from the keyboard application, an indication of the selection of the text field;
   detecting, by the web browser extension, that the text field is a text field designated for coupon codes;
   receiving, by the keyboard application, and from the web browser extension, an indication that the text field is a text field designated for coupon codes; and
   responsive to receiving the indication that the text field is a text field designated for coupon codes, passing a coupon code from the one or more coupon codes into the text field.

4. The method according to claim 1, further comprising, responsive to the first input, storing, by the keyboard application, the coupon code.

5. The method according to claim 1, further comprising:
   responsive to the receiving the indication that the text field is a text field designated for coupon codes, associating, by the keyboard application, a further Graphical User Interface element of the mobile device with the coupon code;
   receiving by the keyboard application, a second input, by the user, corresponding to selection of the further Graphical User Interface element,
   wherein passing a coupon code from the one or more coupon codes into the text field is further responsive to the second input.

6. The method according to claim 1, wherein the located data comprises one or more survey questions, the method further comprising:
   responsive to receiving the input, displaying, by the keyboard application, displaying the one or more survey questions in the Graphical User Interface of the mobile device.

7. The method according to claim 6, further comprising:
   receiving one or more further inputs by the user, said further inputs corresponding to completion of the one or more survey questions; and
   storing, in the database, data indicative of the one or more further inputs in association with a randomly generated identifier and a user identifier.

8. The method according to claim 1, wherein the keyboard application and web browser extension communicate via application programming interface, Application Programming Interface, calls.

9. The method according to claim 1, wherein the keyboard application and web browser extension communicate via a shared storage on the mobile device.

10. The method according to claim 1, wherein the keyboard application and web browser extension communicate via Application Programming Interface API calls to a server, wherein the server is coupled to the keyboard application and the web browser extension.

11. The method according to claim 1, wherein locating the data includes forwarding, by the keyboard application, an Application Programming Interface API call to a server.

12. The method according to claim 1, wherein locating the data includes performing a search of a local storage of the mobile device.

13. The method according to claim 1, wherein the data is merchant data.

14. The method according to claim 13, wherein the cookie allows a merchant associated with the merchant data to determine that a purchase has been made by the user.

15. The method according to claim 14, further comprising receiving a reward issued by the merchant in response to the purchase made by the user.

16. The method according to claim 1, wherein the data is merchant data comprising an active deal associated with the merchant, the associating the Graphical User Interface element with the data comprises displaying text indicating the active deal.

17. A computer-readable memory comprising instructions, that when performed by a processor of a mobile device, cause a keyboard application and web browser extension executing on the mobile device to perform a method comprising:

detecting, by a web browser extension associated with a web browser application executing on the mobile device, a Uniform Resource Locator for a website;

receiving, by a keyboard application executing on the mobile device, and from the web browser extension, the Uniform Resource Locator;

generating, by the keyboard application, a search query based on a domain name associated with the Uniform Resource Locator;

locating data based on the search query, wherein the data is associated with a record, the record comprising a record identifier;

associating, by the keyboard application, an element of a graphical user interface, Graphical User Interface, of the keyboard application, with the record identifier;

receiving, by the keyboard application, an input entered by the user, corresponding to selection of the element of the Graphical User Interface;

responsive to receiving the input:
  generating, by the keyboard application and without user input, a unique tracking link comprising a Uniform Resource Locator and a randomly generated identifier associated with the selection of the Graphical User Interface element, the Uniform Resource Locator being for the website and which is associated with the located data; and
  passing the unique tracking link to the web browser application executing on the mobile device to access the website;

storing, in a database, the unique tracking link in association with the record identifier and a user identifier; and storing, by the web browser application while accessing the website, a cookie comprising the randomly generated identifier associated with the selection of the Graphical User Interface element.

18. A system comprising:

a computer-readable memory comprising instructions, that when performed by a processor of a mobile device, cause a keyboard application and web browser extension executing on the mobile device to perform a method comprising:
  detecting, by a web browser extension associated with a web browser application executing on the mobile device, a Uniform Resource Locator for a website;
  receiving, by a keyboard application executing on the mobile device, and from the web browser extension, the Uniform Resource Locator;
  generating, by the keyboard application, a search query based on a domain name associated with the Uniform Resource Locator;
  locating data based on the search query, wherein the data is associated with a record, the record comprising a record identifier;
  associating, by the keyboard application, an element of a graphical user interface, Graphical User Interface, of the keyboard application, with the record identifier;
  receiving, by the keyboard application, an input entered by the user, corresponding to selection of the element of the Graphical User Interface;
  responsive to receiving the input:
    generating, by the keyboard application and without user input, a unique tracking link comprising a Uniform Resource Locator and a randomly generated identifier associated with the selection of the Graphical User Interface element, the Uniform Resource Locator being for the website and which is associated with the located data; and
    passing the unique tracking link to the web browser application executing on the mobile device to access the website;
  storing, in a database, the unique tracking link in association with the record identifier and a user identifier; and
  storing, by the web browser application while accessing the website, a cookie comprising the randomly generated identifier associated with the selection of the Graphical User Interface element;

a database comprising a plurality of records, each of the records comprising:
  a record identifier;
  data; and
  a Uniform Resource Locator for a website associated with the data; and a server communicatively coupled to the database and configured to locate the data in the database in response to receiving the Application Programming Interface call.

* * * * *